US008019789B2

(12) United States Patent
Dahms et al.

(10) Patent No.: US 8,019,789 B2
(45) Date of Patent: Sep. 13, 2011

(54) SYSTEM AND METHOD OF OBJECT-ORIENTED PERSISTENCE

(75) Inventors: John F. A. Dahms, Waterloo (CA); David P. Yach, Waterloo (CA)

(73) Assignee: Research in Motion Limited, Waterloo (CA)

( * ) Notice: Subject to any disclaimer, the term of this patent is extended or adjusted under 35 U.S.C. 154(b) by 366 days.

(21) Appl. No.: 10/482,756

(22) PCT Filed: Jul. 2, 2002

(86) PCT No.: PCT/CA02/01008
§ 371 (c)(1),
(2), (4) Date: Dec. 29, 2003

(87) PCT Pub. No.: WO03/005203
PCT Pub. Date: Jan. 16, 2003

(65) Prior Publication Data
US 2004/0172420 A1 Sep. 2, 2004

Related U.S. Application Data

(60) Provisional application No. 60/302,872, filed on Jul. 3, 2001.

(51) Int. Cl.
*G06F 17/30* (2006.01)
(52) U.S. Cl. ........ 707/802; 707/705; 707/741; 707/781; 707/822
(58) Field of Classification Search .............. 707/1, 103, 707/204, 100, 200, 3, 705, 741, 781, 822, 707/802
See application file for complete search history.

(56) References Cited

U.S. PATENT DOCUMENTS

| 4,853,842 | A | | 8/1989 | Oxley et al. |
|---|---|---|---|---|
| 5,860,083 | A | * | 1/1999 | Sukegawa ..................... 711/103 |
| 6,009,266 | A | * | 12/1999 | Brownell et al. ............. 719/315 |
| 6,052,690 | A | * | 4/2000 | de Jong ......................... 707/101 |
| 6,076,090 | A | | 6/2000 | Burroughs et al. |
| 6,195,709 | B1 | * | 2/2001 | Gupner et al. ................ 719/316 |
| 6,223,344 | B1 | * | 4/2001 | Gerard et al. ................. 717/170 |
| 6,243,789 | B1 | * | 6/2001 | Hasbun et al. ................ 711/103 |
| 6,330,709 | B1 | * | 12/2001 | Johnson et al. ............... 717/100 |
| 6,411,954 | B1 | * | 6/2002 | Roffe et al. ....................... 707/8 |
| 6,453,319 | B1 | * | 9/2002 | Mattis et al. .................. 707/100 |
| 6,484,247 | B1 | * | 11/2002 | Gendron et al. .............. 711/170 |
| 6,502,108 | B1 | * | 12/2002 | Day et al. ...................... 707/203 |

(Continued)

OTHER PUBLICATIONS

Fu, et al.: "A Concurrent Programming Environment for Memory-Mapped Persistent Object Systems," Proceedings of the Annual International Computer Software and Applications Conference, Phoenix, AZ, Nov. 1993, Los Alamitos, IEEE Comp. Soc. Press, US, vol. Conf. 17, Nov. 1993, pp. 291-297, XP010140176, ISBN: 0-8186-4440-0.

(Continued)

*Primary Examiner* — Tim T. Vo
*Assistant Examiner* — Dangelino N Gortayo
(74) *Attorney, Agent, or Firm* — Jones Day; Krishna K. Pathiyal; Robert C. Liang

(57) ABSTRACT

A system and method for handling an application's access of persisted objects for use within a mobile communications device. The device includes a non-volatile storage device that has at least a portion of its storage locations addressable by the application. A reference table contains the addresses of persisted objects contained in the storage device. Via the reference table, an application can locate persisted objects stored in the storage device.

69 Claims, 19 Drawing Sheets

U.S. PATENT DOCUMENTS

| | | | | |
|---|---|---|---|---|
| 6,571,252 | B1* | 5/2003 | Mukherjee | 707/103 R |
| 6,763,424 | B2* | 7/2004 | Conley | 711/103 |
| 6,766,413 | B2* | 7/2004 | Newman | 711/113 |
| 6,769,053 | B1* | 7/2004 | De Jong et al. | 711/156 |
| 6,785,767 | B2* | 8/2004 | Coulson | 711/112 |
| 6,792,606 | B2* | 9/2004 | Halter et al. | 719/315 |
| 6,854,115 | B1* | 2/2005 | Traversat et al. | 718/1 |
| 6,901,481 | B2* | 5/2005 | Olson | 711/129 |
| 6,912,520 | B2* | 6/2005 | Hankin et al. | 707/1 |
| 6,912,633 | B2* | 6/2005 | de Jong | 711/163 |
| 6,963,875 | B2* | 11/2005 | Moore et al. | 707/999.101 |
| 6,981,070 | B1* | 12/2005 | Luk et al. | 710/5 |
| 7,024,656 | B1* | 4/2006 | Ahad | 717/116 |
| 7,139,864 | B2* | 11/2006 | Bennett et al. | 711/103 |

OTHER PUBLICATIONS

Sun, et al.: "Transparent Access to Persistent Objects in Object-Oriented Databases," Technology of Object-Oriented Languages, 1997, Tools 24, Proceedings Beijing, China, Sep. 1997, Los Alamitos, CA, USA, IEEE Comput. Soc., US, 1998, pp. 38-42, XP010303018, ISBN: 0-8186-8551-4.

Wu, et al.: "eVNy: A NonVolative Main Memory Storage System," Workstation Operating Systems, 1993, Proceedings, Fourth Workshop on Napa, CA, USA, Oct. 1993, Los Alamitos, CA, USA, IEEE Comput. Soc., pp. 116-118, XP010096049, ISBN: 0-8186-4000-6.

Grosso, William; Java RMI, Chapter 10, Serialization, 2001 O'Reilly & Associates, Inc., Sebastopol, CA, US.

Duchier Denys et al: "A Higher-order Module Discipline with Separate Compilation, Dynamic Linking, and Pickling", Programming Systems Lab DFKI and Universitat des Saarlandes Postfach 15 11 50, D-66041 Saarbrucken, Germany, Sep. 29, 1998.

CIPO: Office Action dated Aug. 8, 2006 for Canadian Patent Application No. 2,452,534.

EPO: Communication pursuant to Article 96(2) EPC dated Feb. 8, 2007 for European Patent Application No. 02 745 001.4-2211.

\* cited by examiner

FIG. 11 - GROUPING

FIG. 12 -group reference table data structure

SYSTEM AND METHOD OF OBJECT-ORIENTED PERSISTENCE

RELATED APPLICATION

This application claims priority to U.S. provisional application Ser. No. 60/302,872 entitled "System and Method of Object-Oriented Persistence" filed Jul. 3, 2001. By this reference, the full disclosure, including the drawings, of U.S. provisional application Ser. No. 60/302,872 is incorporated herein.

BACKGROUND

1. Field of the Invention

This invention relates to the field of information storage. Particularly, this invention relates to storing object-oriented information within an object-oriented environment.

2. Discussion of the Related Art

Presently known techniques for storing objects, such as the serializable interface of the java.io package in Sun Microsystems Java™ 2 SE (v1.3), may impose undue limitations such as assuming that the storage involves an underlying file on a file system. For instance, known techniques for storing objects may require that the object be first retrieved from storage, then restored to a useable state, in order to be used.

SUMMARY

The present invention overcomes such disadvantages as well as others. In accordance with the teaching of the present invention, a system and method are disclosed that handle an application's access of persisted objects for use within a mobile communications device. The device includes a non-volatile storage device that has at least a portion of its storage locations addressable by the application. A reference table contains the addresses of persisted objects contained in the storage device. Via the reference table, an application can locate persisted objects stored in the storage device. Further features of the invention will be described or will become apparent in the course of the following detailed description.

BRIEF DESCRIPTION OF THE DRAWINGS

In order that the invention be more clearly understood, embodiments thereof will now be described in detail by way of example only, with reference to the accompanying drawings, in which.

The same reference numerals are used in different figures to refer to similar elements.

DETAILED DESCRIPTION OF THE PREFERRED EMBODIMENT

Figure 1:
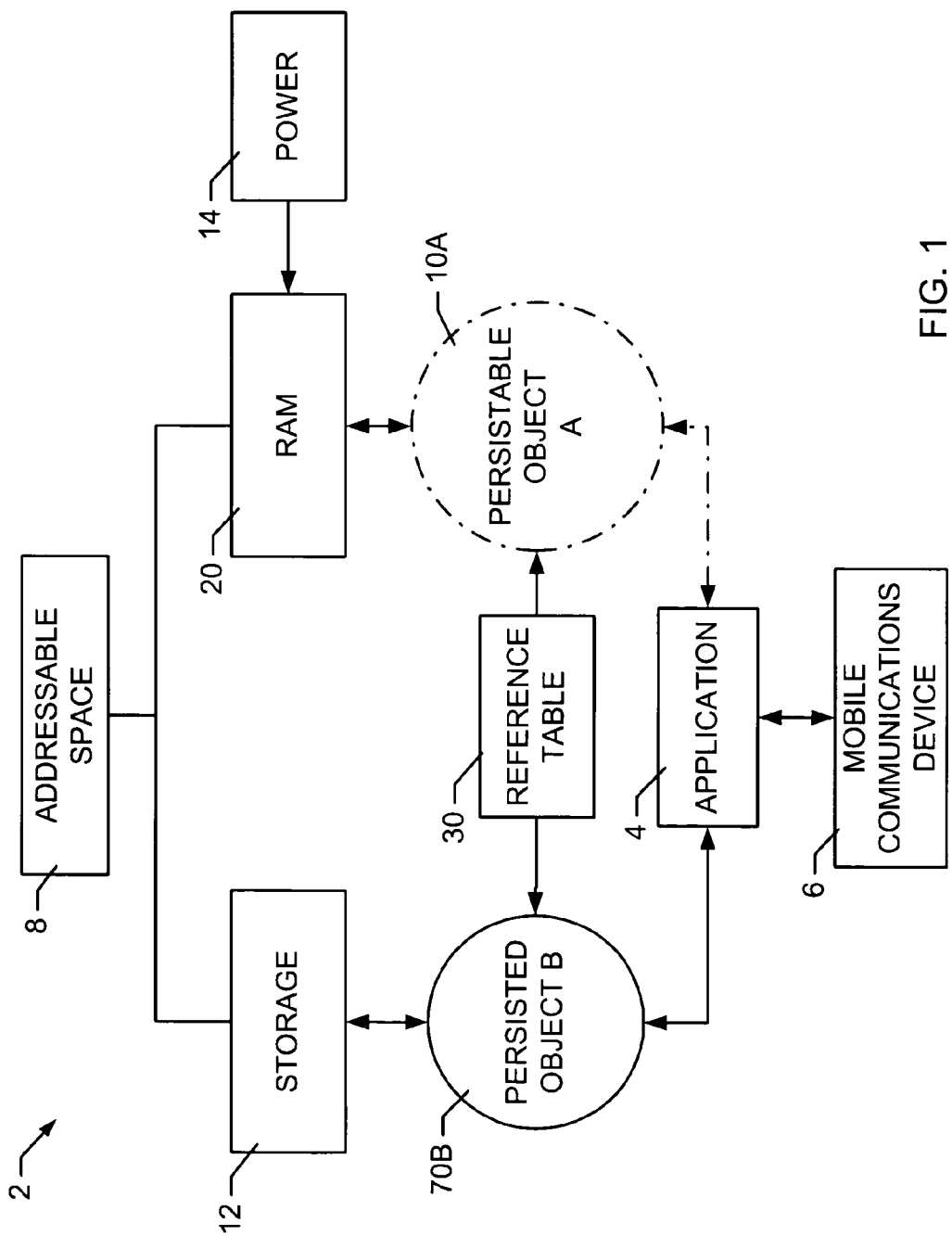
FIG. 1 is a block diagram illustrating software and computer components used in persisting and unpersisting objects.

FIG. 1 depicts a system 2 to handle an application's 4 access of objects (e.g., 10A and 70B) within the environment of a mobile communications device 6. Through use of a reference table 30, the application 4 accesses desired objects 10A and 70B without special regard to whether the objects 10A and 70B are stored in random access memory (RAM) 20 or a non-volatile storage device 12, respectively. RAM 20 and the storage device 12 have addresses that are within an addressable space.

Some storage devices can be addressed like conventional RAM, such as flash memory for instance. In the case where storage is addressed like conventional RAM, a persisted object can be read directly from storage. In this way, both reading and writing of persisted objects can be accomplished while an object is persisted. The addressable space for RAM 20 and the storage device 12 may comprise the same addressable space, or substantially the same addressable space. In a different embodiment, the addressable space may be different.

A persisted object (e.g., object 70B) is an object that has achieved object-oriented persistence and is located in the storage device 12. Similarly, an object that has the potential to be persisted (such as object 10A in RAM 20) is defined as a persistable object. Persisting an object is defined as the process of providing a persisted object from a persistable object. Unpersisting an object is defined as the converse, the process of providing a persistable object from a persisted object. Persisted objects are stored in the storage device 12 whose contents are unaffected if power 14 is removed (whereas the contents of volatile memory 20 are lost when power 14 is no longer supplied to it). As used in this description and in the appended claims, object-oriented persistence may include the format being occupied by an object in storage 12 being substantially similar to the format a corresponding object occupies in RAM 20. By using the same format in storage 12 as in RAM 20, only systematic operations are required to restore persisted objects to a useable state.

Since virtually no operations are required in the system 2 to restore a persisted object to a useable state, a persisted object can be used directly from the storage device. A useable persisted object may continue to be referenced by other objects residing in either RAM or storage, as well as reference other objects. As a consequence, a mobile communications device such as a PDA, cellular telephone, or data communications device can selectively move objects to and from storage without consuming significant resources. Once an object is persisted, it can continue to be used in substantially the same way as an object in RAM. This is a significant advantage over an unusable serialized object, which has to be loaded to be used, and may typically take up to three orders of magnitude more time to become useable. It is noted that file access times may be measured in milliseconds whereas memory access may be measured in nanoseconds.

For example, in a mobile device address-book application, an Address object might have a Name attribute and a Telephone attribute. Since most address-book entries do not change very often and are used regularly, it may be desirable to persist address-book entries so that they can be both stored and read in the future. Address objects benefit by being persistable, and benefit from being useable persisted objects. Since the Name and Telephone attributes (being integral to an Address object) may also be useable persisted objects, an object-oriented runtime is able to read useable persisted Address objects directly while they reside in storage 12 without need to retrieve Address objects from storage 12. This is a significant savings that may allow a persisted object to take several orders of magnitude less time to become useable in comparison to a serialized object. Furthermore, by using substantially the same format in RAM 20 and in storage 12, persisted objects are less likely to become obsolete.

The system 2 includes a reference table 30 that locates objects 10A and 70B whether they are in RAM 20 or the storage device 12. For example where an application 4 wishes to access persistable object A 10A, the reference table 30 provides the memory address of the persistable object A 10A which is located in RAM 20. If the application 4 also has need to access persisted object B 70B, then the reference table 30 provides the memory address of the persisted object B 70B, which is located in the storage device 12. It should be understood that the system 2 may store objects for direct access by the application 4 in both the storage device 12 and RAM 20, or solely in the storage device 12, or solely in RAM 20. The system 2 is configured with the combination that best suits the application at hand. It should also be understood that one or more applications may utilize the system 2 to access the objects referenced in the reference table 30. Further it should be understood that the system 2 may include persistence of module objects to provide useable persisted modules. Modules may be used, for instance, to hold target-linked object classes. If the module is not useable from storage, virtually no operations are required to render it useable once unpersisted. However, by useably persisting modules, it is possible to execute code for an object-oriented runtime directly from storage 12.

Figure 2:
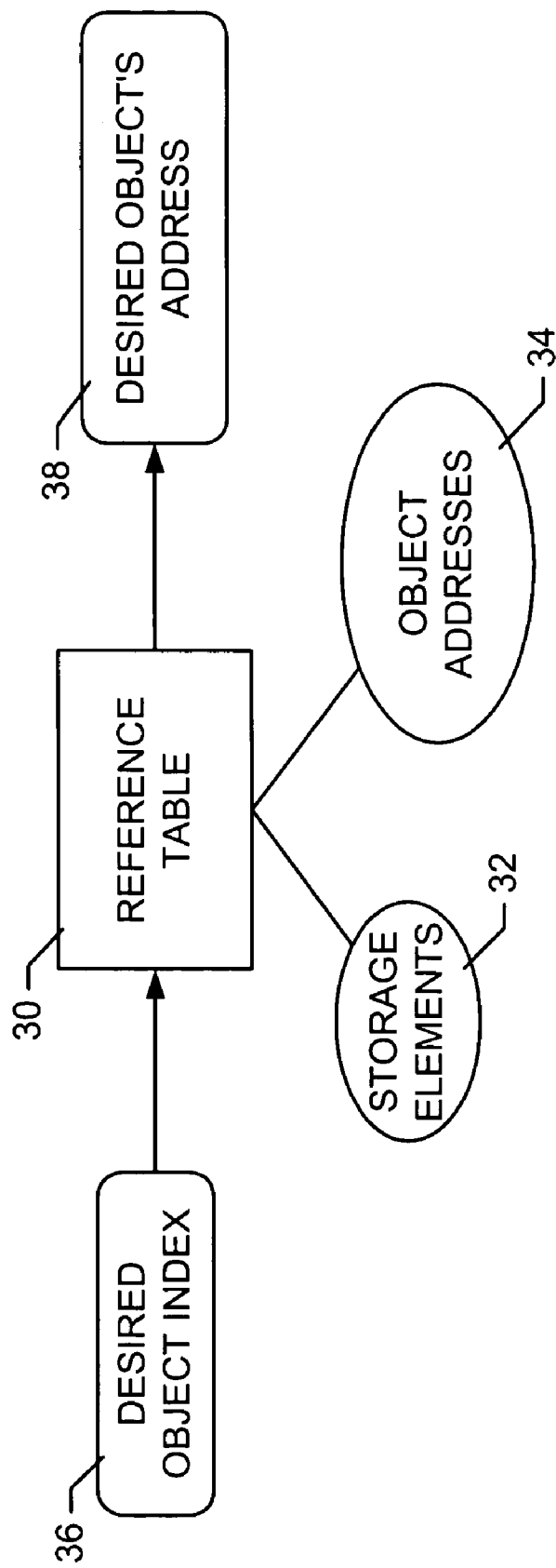
FIG. 2 is a data structure diagram illustrating a reference table.

FIG. 2 depicts a data structure of the reference table 30. Indexed storage elements 32 within the reference table 30 contain addresses 34 to the objects stored in the storage device or in RAM. Given a desired object's index 36 to a storage element 32, the desired object's address 38 is obtained from the reference table 30. An object's address 34 in a storage element 32 reflects whether the object is in a storage device or RAM. The reference table, 30 obviates an application having to specially recognize where the object is stored.

Figure 3:
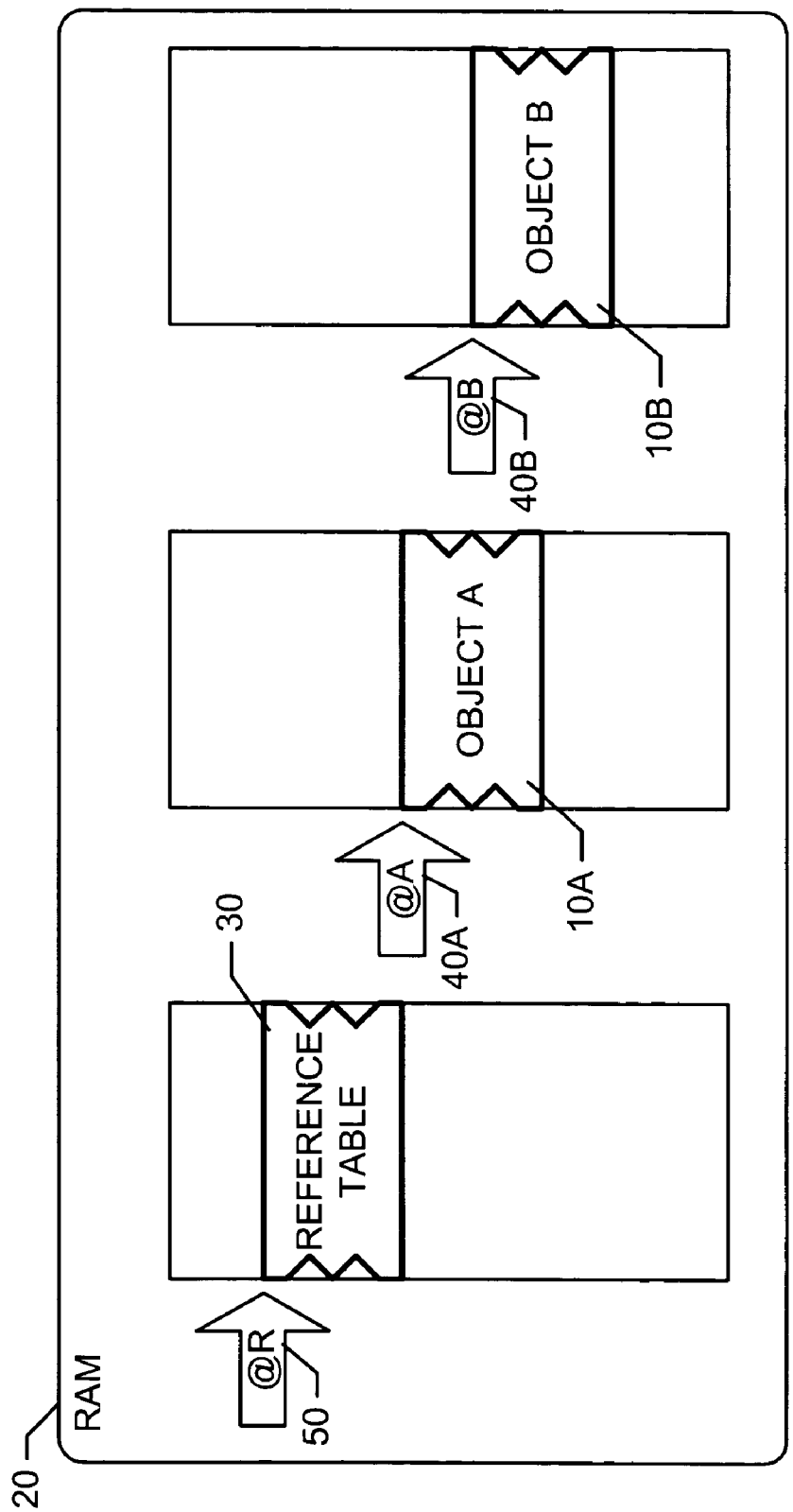
FIGS. 3 and 4 are block diagrams illustrating an example of a format occupied by objects in RAM and that may be accessed via a reference table.
Figure 4:
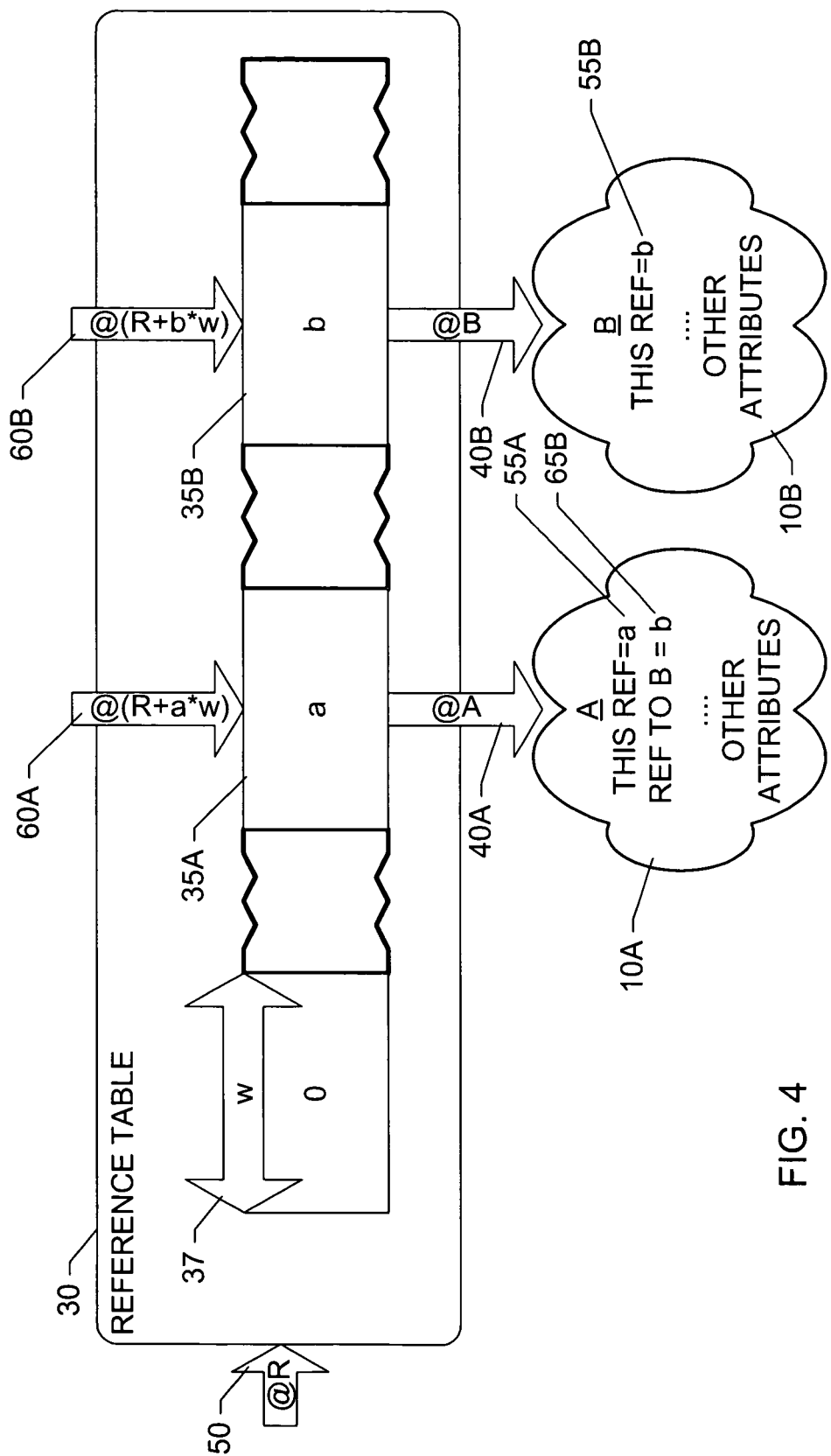

FIGS. 3 and 4 depict an example of a format occupied by objects in RAM and that may be accessed via the reference table: Two objects 10A and 10B are shown as they might appear somewhere in RAM 20. The reference table 30 is also situated in RAM 20. The reference table 30 has several storage elements 35A and 35B of a fixed size "w" 37 to simplify the indexed access to storage elements. Each used storage element 35A and 35B corresponds to an object 10A and 10B which is somewhere in an addressable space. For instance object A 10A finds correspondence with storage element index "a" 35A whereas object B 10B finds correspondence with storage element index "b" 35B. The address 40A and 40B of corresponding objects 10A and 10B is stored in a storage element 35A and 35B, so that knowing the index of an object in the reference table 30 it is possible to obtain the address 40A and 40B of an object. This is done by first obtaining the address @R 50 of the reference table 30. Then, given an object's reference, such as "a" 55A for object A 10A, the address of the storage element @(R+a*w) 60A can be obtained by multiplying the index 55A "a" by the size "w" 37 of each storage element and adding to the resulting value the address @R 50 of the reference table 30. The address of the storage element @(R+b*w) 60B corresponding to object B 10B can be obtained using the same technique by using index "b" in lieu of "a". Since the "a" storage element 35A holds the address of the corresponding object A 10A, resolving the contents of the storage element 35A provides the address @A 40A of object A 10A. Also shown is how each object 10A and 10B contains within its format its own reference 55A and 55B related to the reference table 30. Also shown is how, for example, object A 10A contains within its format a reference "b" 65B to object B 10B. This allows a runtime context within the scope of object A 10A to be able to access object B 10B.

Although not expressly shown in the drawings, other attributes such as references to other objects, or atomic data types, may be present within the formats of objects. Although not expressly shown in the drawings, many instances of objects may exist in an addressable space. In the example of FIG. 3, two instances 10A and 10B of classes have been illustrated. It should be understood that each instance may be of a different class, or alternatively that each instance may be of the same class. In the first case, the object A 10A may be an instance of class "A" whereas object B 10B may be an instance of class "B". For example, object A might be an instance of an Address class and object B might be an instance of a Name class. There may be several instances of the Address class and Name class situated somewhere in the addressable space, such as in RAM. For the sake of brevity and clarity, only one instance of class "A" and "B" were discussed. Alternatively in the second case, object A 10A and object B 10B could both be instances of the same class. Objects A and B are used by way of example only with the understanding that in practice there may be many objects which are instances of many classes.

Figure 5:
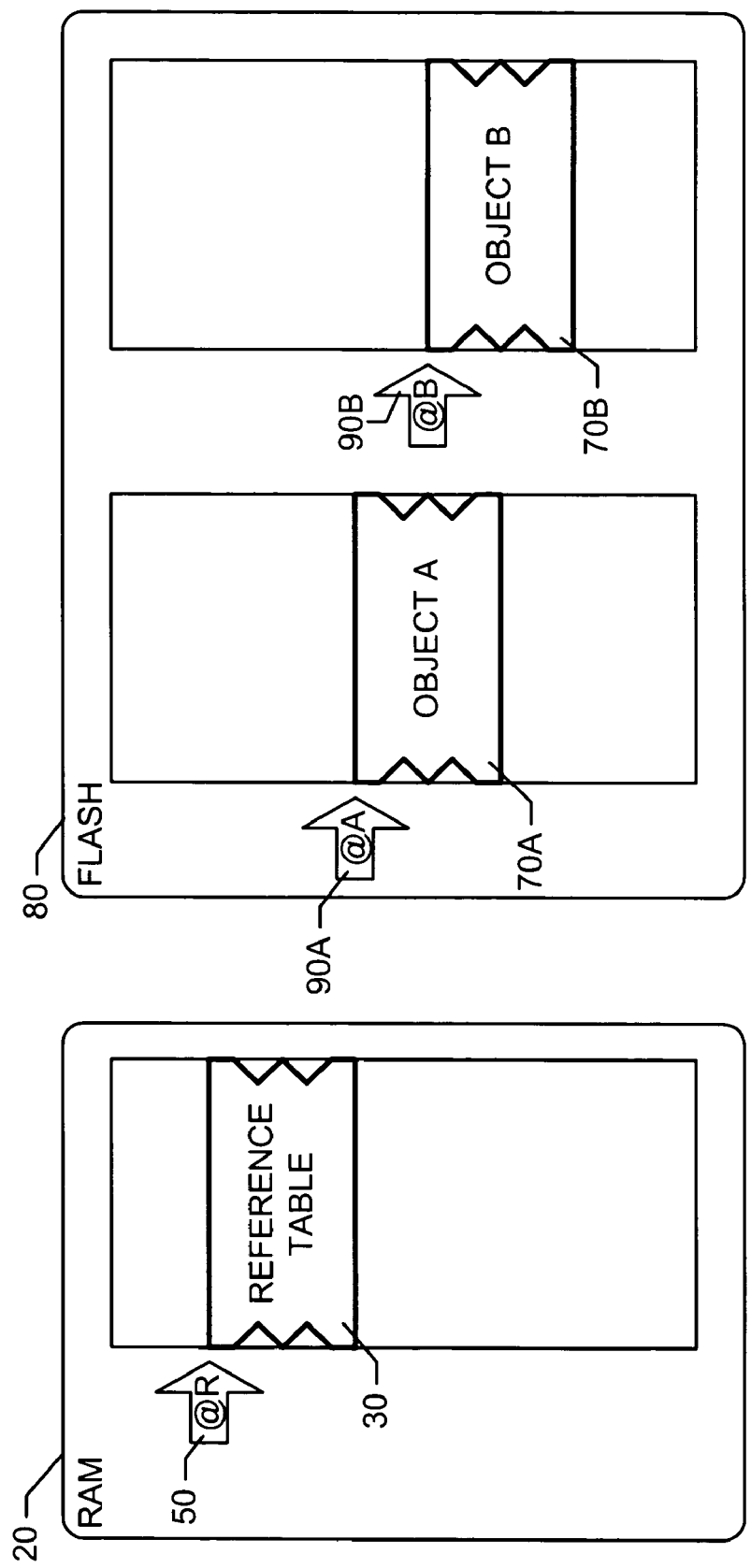
FIGS. 5 and 6 are block diagrams illustrating an example of a format occupied by persisted objects and that may be accessed via a reference table.
Figure 6:
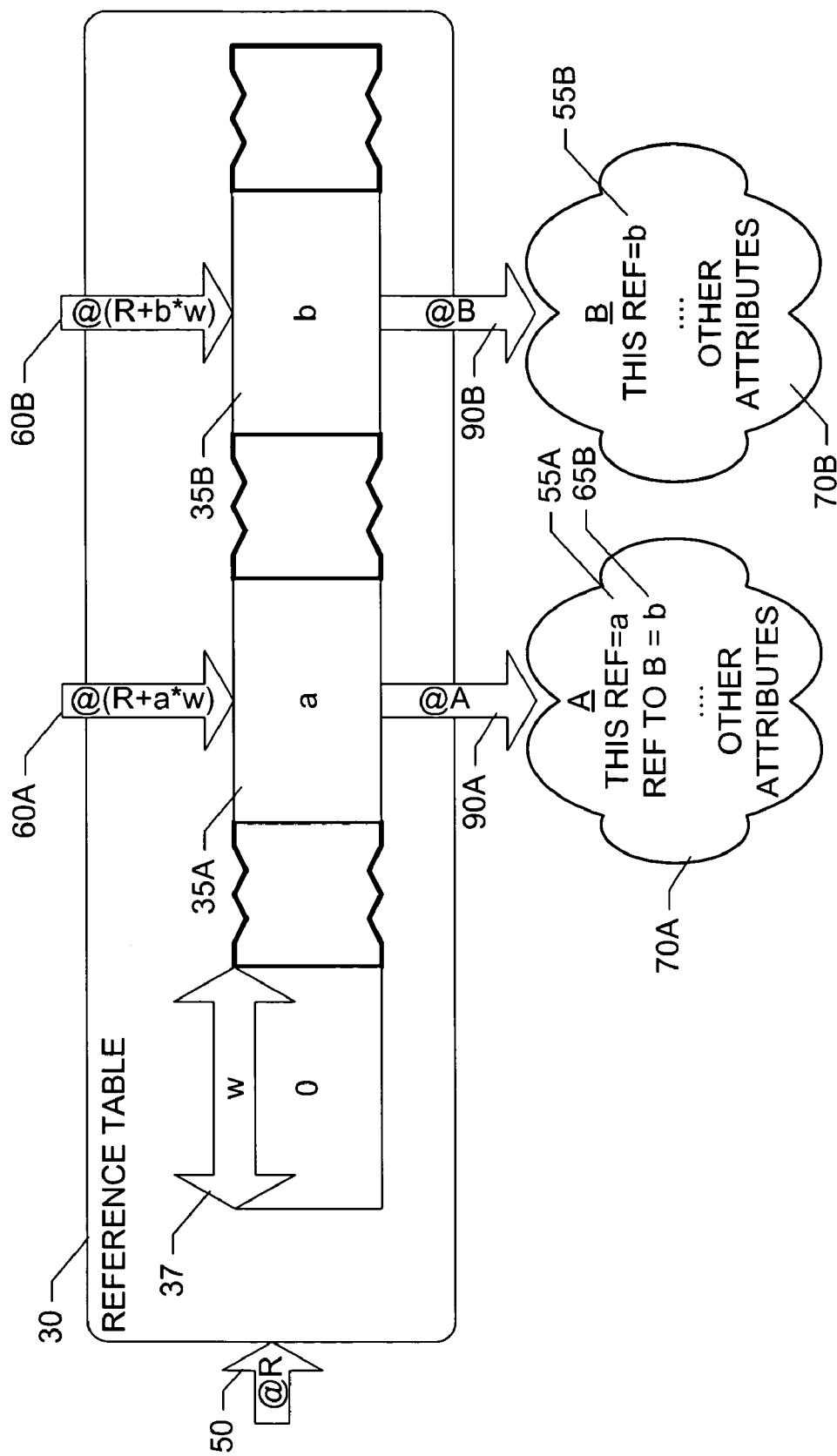

FIGS. 5 and 6 depict an example of the format occupied by persisted objects and that may be accessed via a reference table. Two useable persisted objects 70A and 70B are illustrated as they might appear somewhere in storage, such as flash 80. The address of persisted objects 70A and 70B are stored in reference table 30 storage elements 35A and 35B, so that by knowing the index of a persisted object in the reference table 30 it is possible to obtain the address 90A, 90B of the persisted objects. By obtaining the address @R 50 of the reference table 30, given a persisted object's reference, such as "b" 55B for the example B persisted object 70B, the address of the storage element @(R+b*w) 60B can be obtained by multiplying the index 55B "b" by the size "w" 37 of each storage element and adding the resulting value to the address @R 50 of the reference table 30. Since the "b" storage element 35B holds the address of the corresponding persisted object B 70B, resolving the contents of the storage element 35B provides the address @B 90B of persisted object B 70B. The same technique can be used to provide the address 90A of persisted object 70A from the address of storage element @(R+a*w) 60A. Also shown is how each persisted object 70A and 70B contains within its format its own reference 55A and 55B related to the reference table 30. Also shown is how, for example, persisted object A 70A contains within its format a reference "b" 65B to persisted object B 70B. This allows a runtime context within the scope of persisted object A 70A to be able to access persisted object B 70B.

Persisted objects A 70A and B 70B are situated in flash 80. The format in flash 80 of persisted objects 70A, 70B of FIG. 5 is substantially similar to corresponding objects 10A and 10B in RAM 20 of FIG. 3. Since flash 80 is addressable and can be read substantially in the same way as RAM 20, and since the persisted objects 70A, 70B are substantially in the same format as corresponding un-persisted objects 10A and 10B of FIG. 3, persisted objects 70A, 70B can be referenced by the runtime context "as if" they were in RAM 20, thereby making them useable persisted objects.

When power is shut off, persisted objects A 70A and B 70B will remain stored in flash 80. However, reference table 30 will be lost making persisted objects A 70A and B 70B temporarily unusable. When power is restored, reference table 30 can be systematically repopulated by reading flash 80 since every persisted object 70A, 70B has within its format its own reference, thereby restoring useable persisted objects A 70A and B 70B. Re-population will be described in greater detail in reference to FIG. 19.

Figure 7:
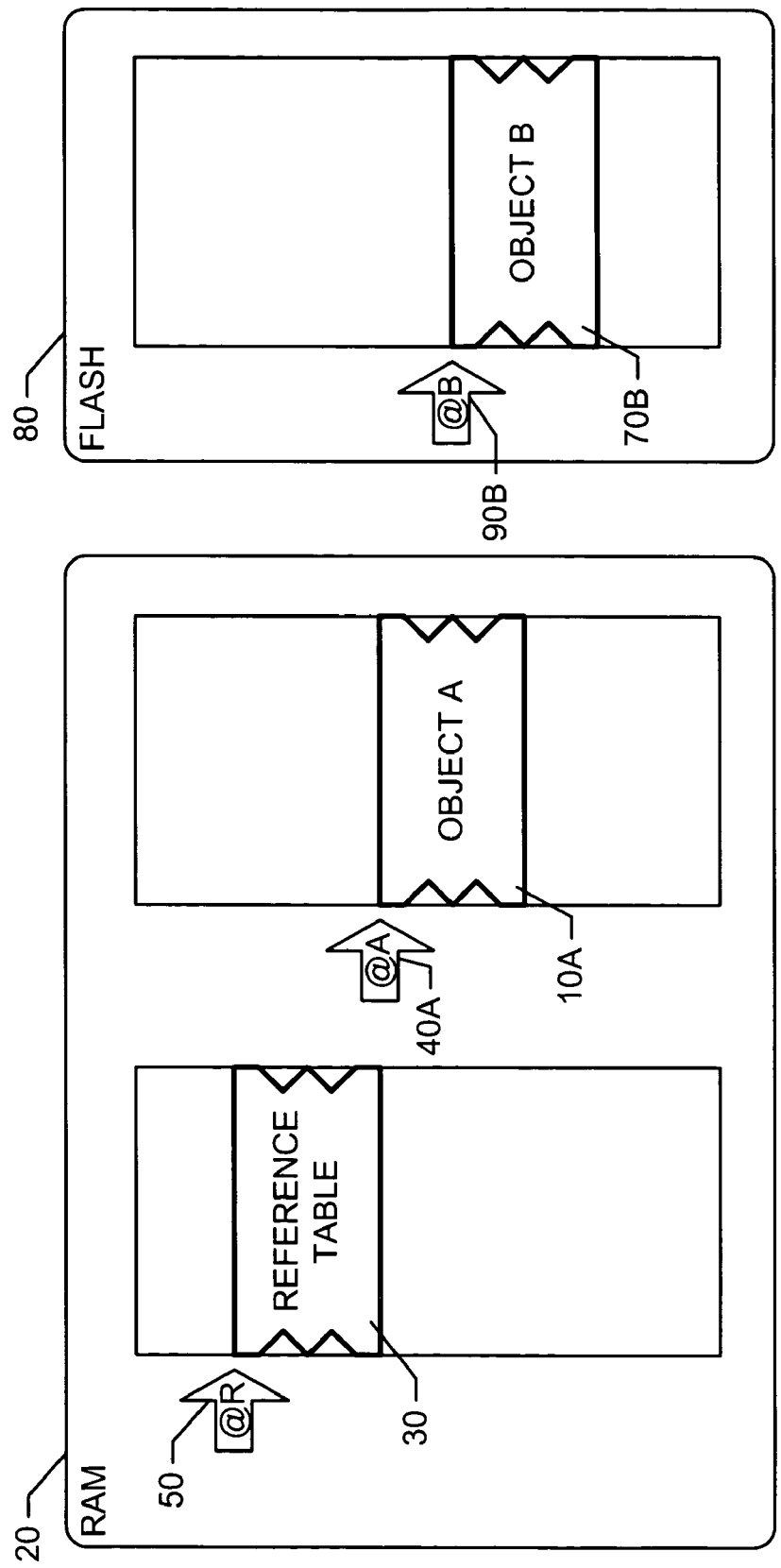
FIGS. 7 and 8 are block diagrams illustrating cooperation of objects in RAM and non-volatile storage.
Figure 8:
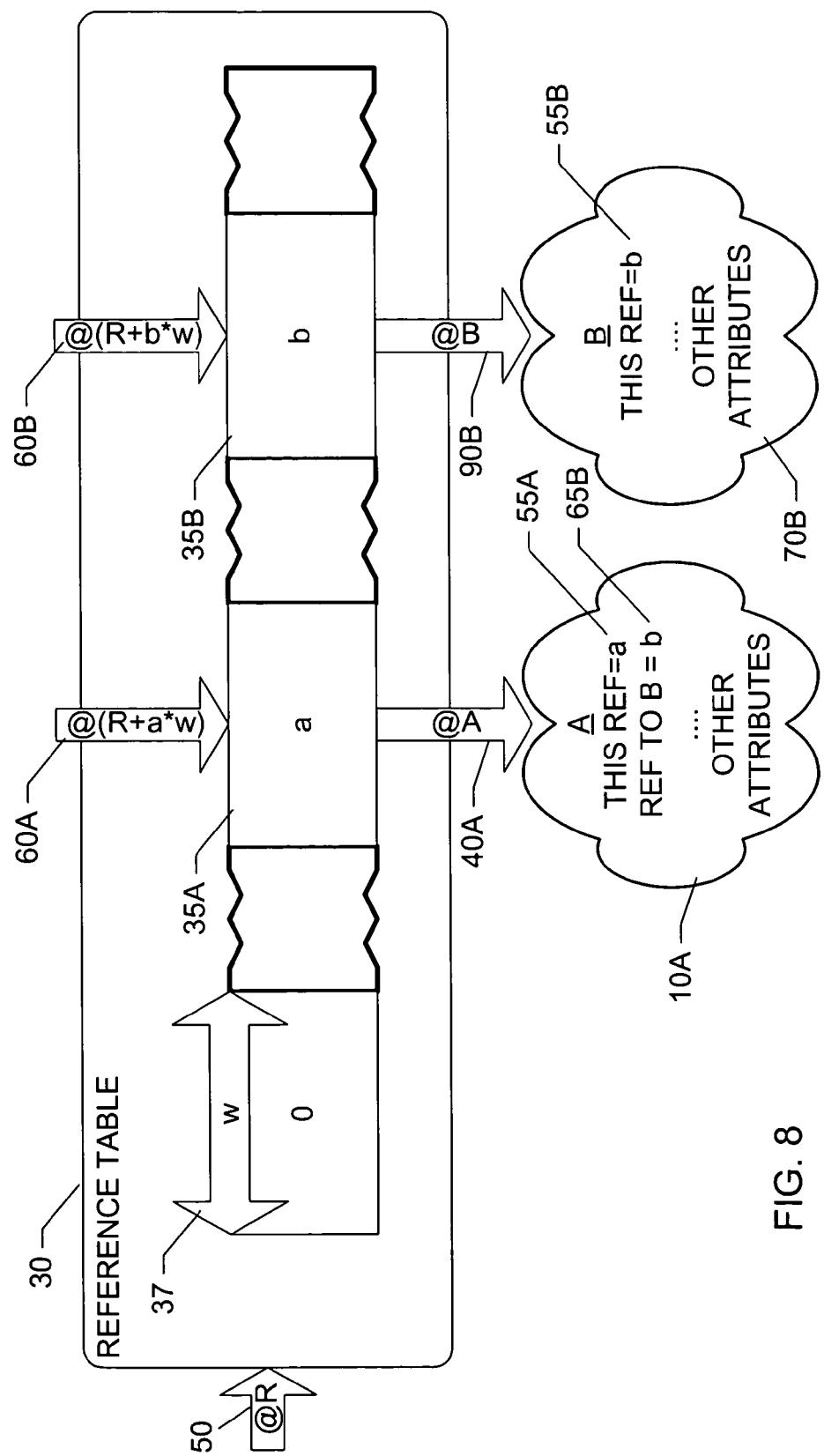

In reference to FIGS. 7 and 8, a block diagram illustrating the cooperation of objects in RAM and persisted objects is described. An object 10A and a useable persisted object B 70B are illustrated, as they might appear somewhere in RAM 20 and flash 80 respectively. Also illustrated is a reference table 30, situated somewhere in RAM 20. This allows a runtime context within the scope of object A 10A to be able to access usable persisted object B 70B, regardless of the fact that object B 70B is in flash 80 and object A 70A is in RAM 20.

A persisted object, such as object B 70B, may contain a reference (not shown) to a non-persisted object, such as object A 10A. This allows a runtime context within the scope of persisted object B 70B to be able to access object A 10A, regardless of the fact that object B 70B is in flash 80 and object A 70A is in RAM 20. Furthermore, a runtime context within the scope of persisted object B 70B, such as an instance method context, may receive an object reference to object A 10A as a parameter.

Figure 9:
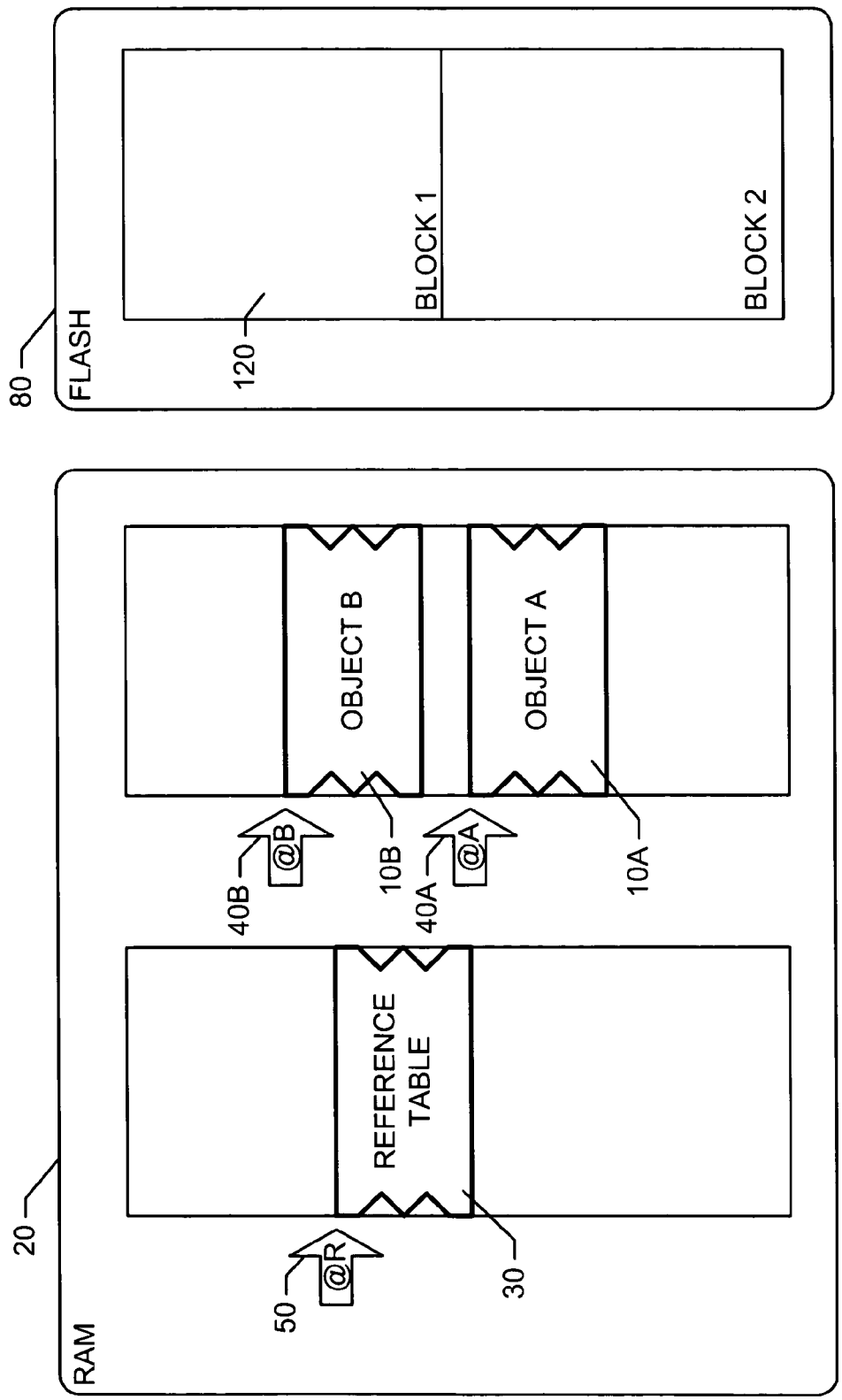
FIGS. 9 and 10 are block diagrams illustrating un-grouped persistable objects.
Figure 10:
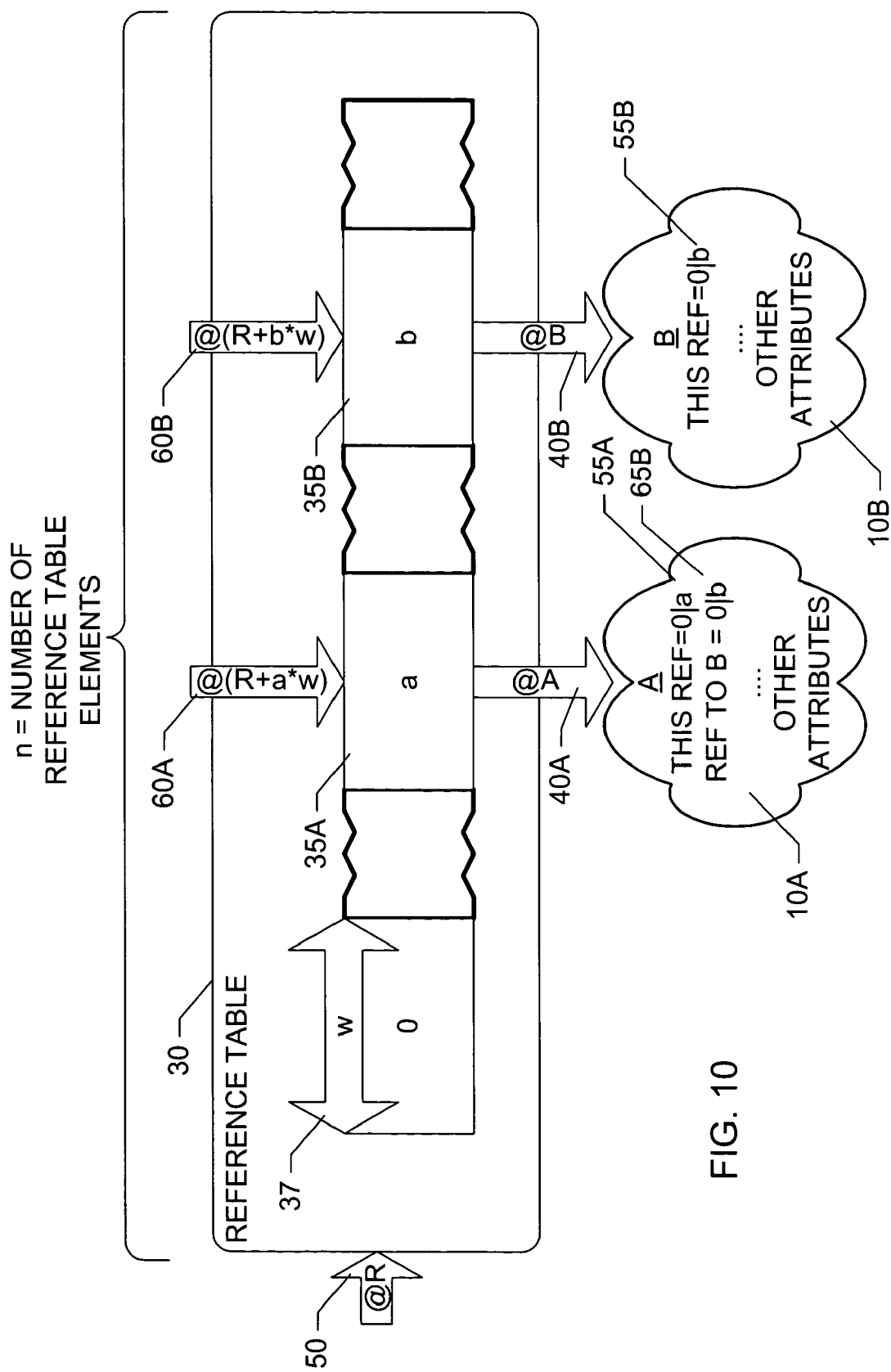

In reference to FIGS. 9 and 10, block diagrams illustrating un-grouped persistable objects are described. Two objects 10A and 10B are illustrated as they might appear somewhere in RAM 20. Also illustrated is a reference table 30, situated somewhere in RAM 20. In situations where it is desired to impose an upper limit on the amount of RAM 20 dedicated to storing object references, reference table 30 may have a maximum of n storage elements. This might be the case, for instance, in a device with limited RAM 20. By imposing an upper limit n, the reference table 30 can be maintained within a reasonable size. Each used storage element corresponds to objects 10A and 10B which are somewhere in an addressable space, which makes un-grouped objects 10A and 10B compatible with other objects thus far described. For instance object A 10A finds correspondence with storage element "a" 35A whereas object B 10B finds correspondence with storage element "b" 35B. The address of corresponding objects 10A and 10B are stored in storage element 35A, 35B, so that knowing the index of an object in the reference table 30 it is possible to obtain the address 40A, 40B of an object. This is done by first obtaining the address @R 50 of the reference table 30. Then, given an objects reference 55A, such as "0|a" for the example A object 10A, the address of the storage element @(R+a*w) 60A can be obtained by multiplying the index 55A "a" by the size "w" 37 of each storage element and adding to the result the address @R 50 of the reference table 30. Similarly, the address of storage element @(R+b*w) 60B can be obtained given an objects reference 55B, such as "0|b" for the example B object B 10B. The address of the object @A 40A is contained in the corresponding storage element 35A. Similarly, the address of the object @B 40B is contained in the corresponding storage element 35B. The purpose of the "offset" is described further in FIG. 11 in reference to grouped persisted objects. Since both objects A 10A and B 10B are un-grouped, the "offset" value is 0 for each, as is illustrated by the corresponding "this ref=0|a" for object A 10A and "this ref=0|b" for object B 10B. Also shown is how flash 80 might comprise several blocks 120, of which only 2 are illustrated for brevity. This is meant to illustrate how some flash 80 may be addressed to be read in a manner substantially similar to RAM 20, but may be only written to in blocks 120.

Figure 11:
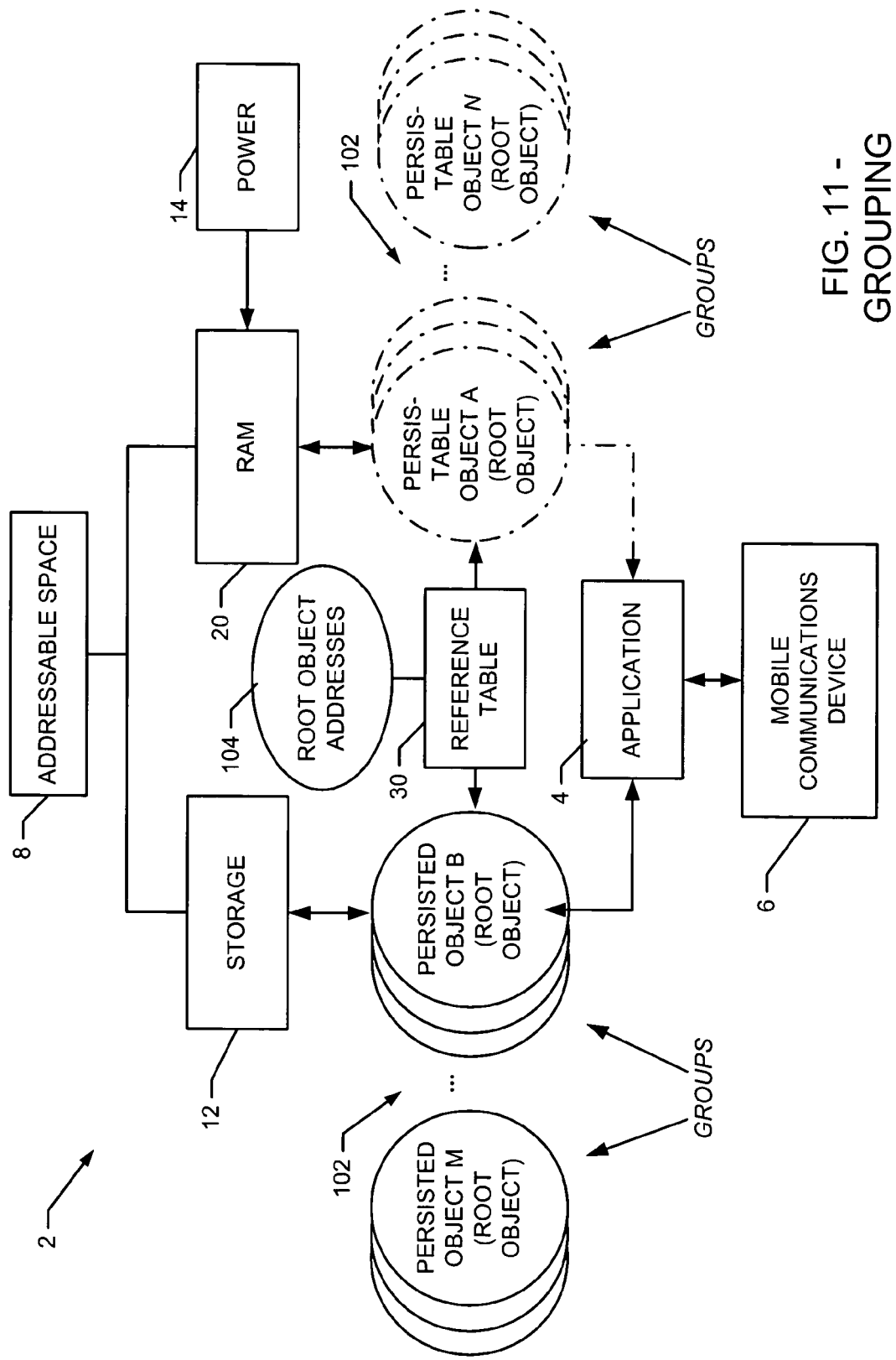
FIG. 11 is a block diagram illustrating groupings of object references.

The block technique may also use object grouping. Grouping conserves reference table's RAM 20 usage. FIG. 11 shows groupings 102 of object references so that objects integral to a "root" object are located in addressable space in substantially close proximity to the "root" object. In this way, RAM 20 can be used more efficiently since it only uses a single object reference element 104 in the reference table 30 for each "root" object in a group. Grouped object references 102 are updated so that they are offset relative to the "root" object. Object reference grouping is defined as relating object addresses in a group of objects by an offset to a "root" object reference that integrates the group.

Figure 12:
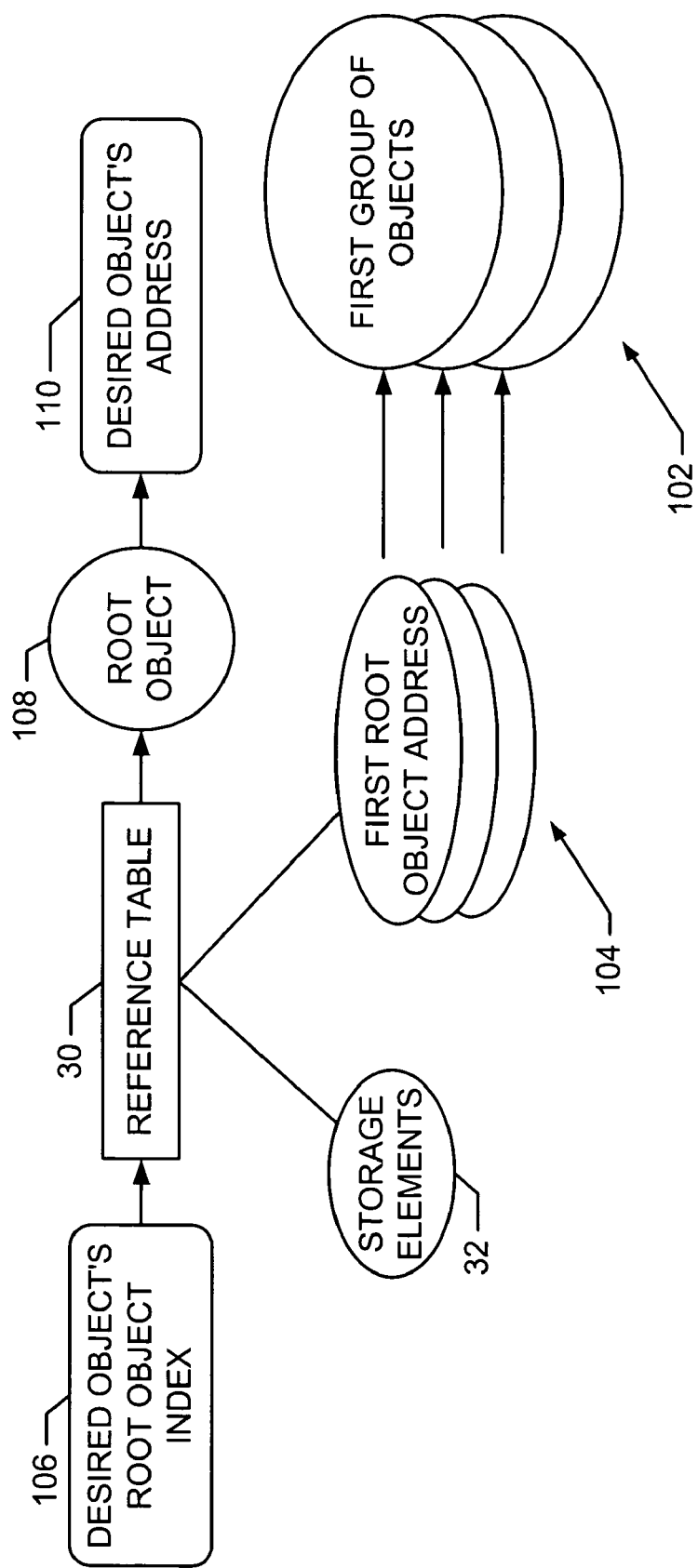
FIG. 12 is a data structure diagram illustrating a reference table for use in groupings of object references.

FIG. 12 depicts a reference table data structure for use in groupings of object references. Indexed storage elements 32 within the reference table 30 contain addresses 104 to the "root" objects stored in the storage device or in RAM. Given a desired object's root object's index 106, the root object's address is obtained from the reference table 30. A root object's address in a storage element 32 reflects whether the object is in a storage device or RAM. The "root" object 108 contains object references to its integral grouped objects, such as the desired object. The desired object is referenced in the format of the "root" object. The address 110 of the desired object is related to the address of the "root" object by an "offset" as discussed in greater detail in reference to FIGS. 13 and 14.

Figure 13:
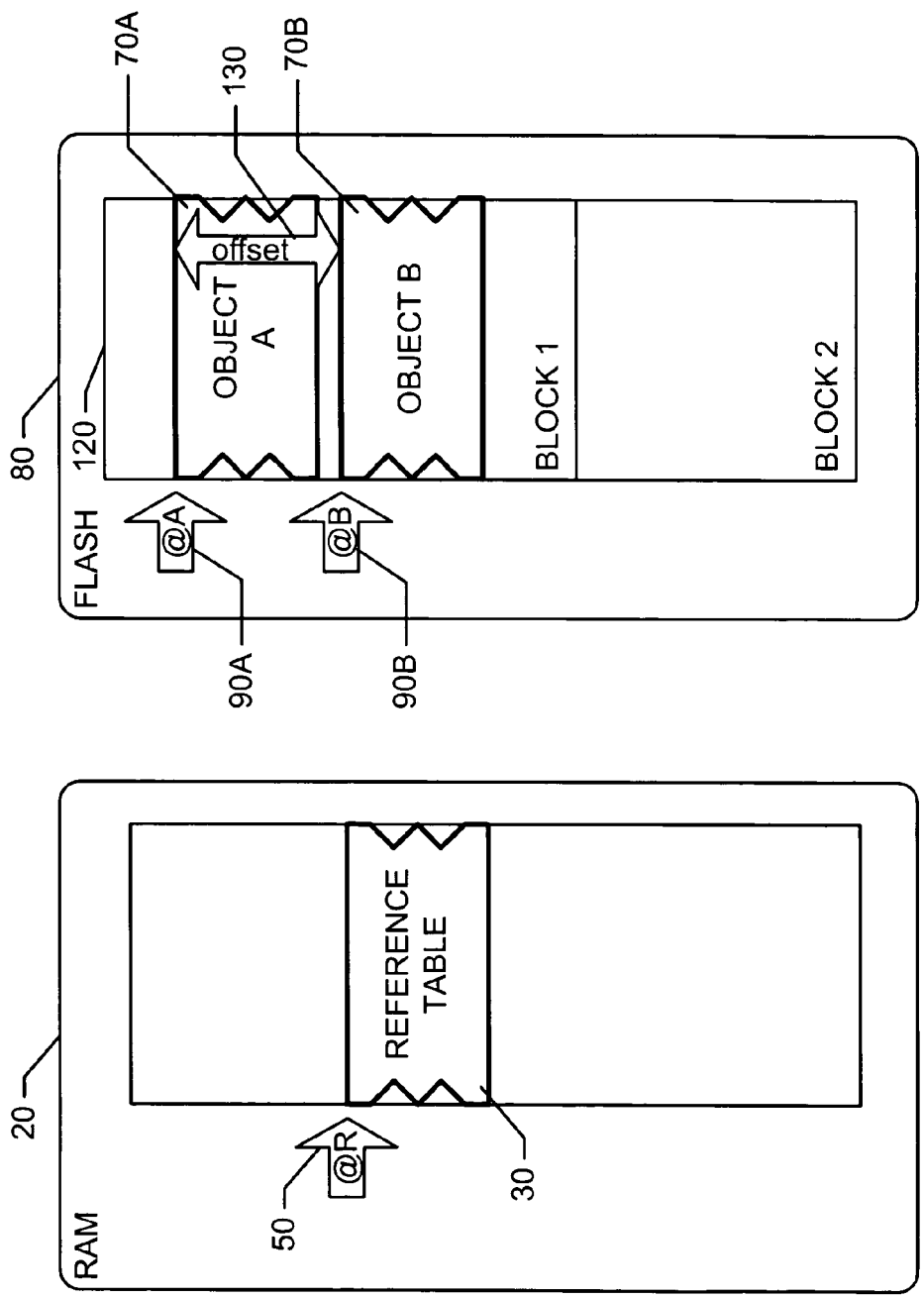
FIGS. 13 and 14 are block diagrams illustrating grouped persisted objects.
Figure 14:
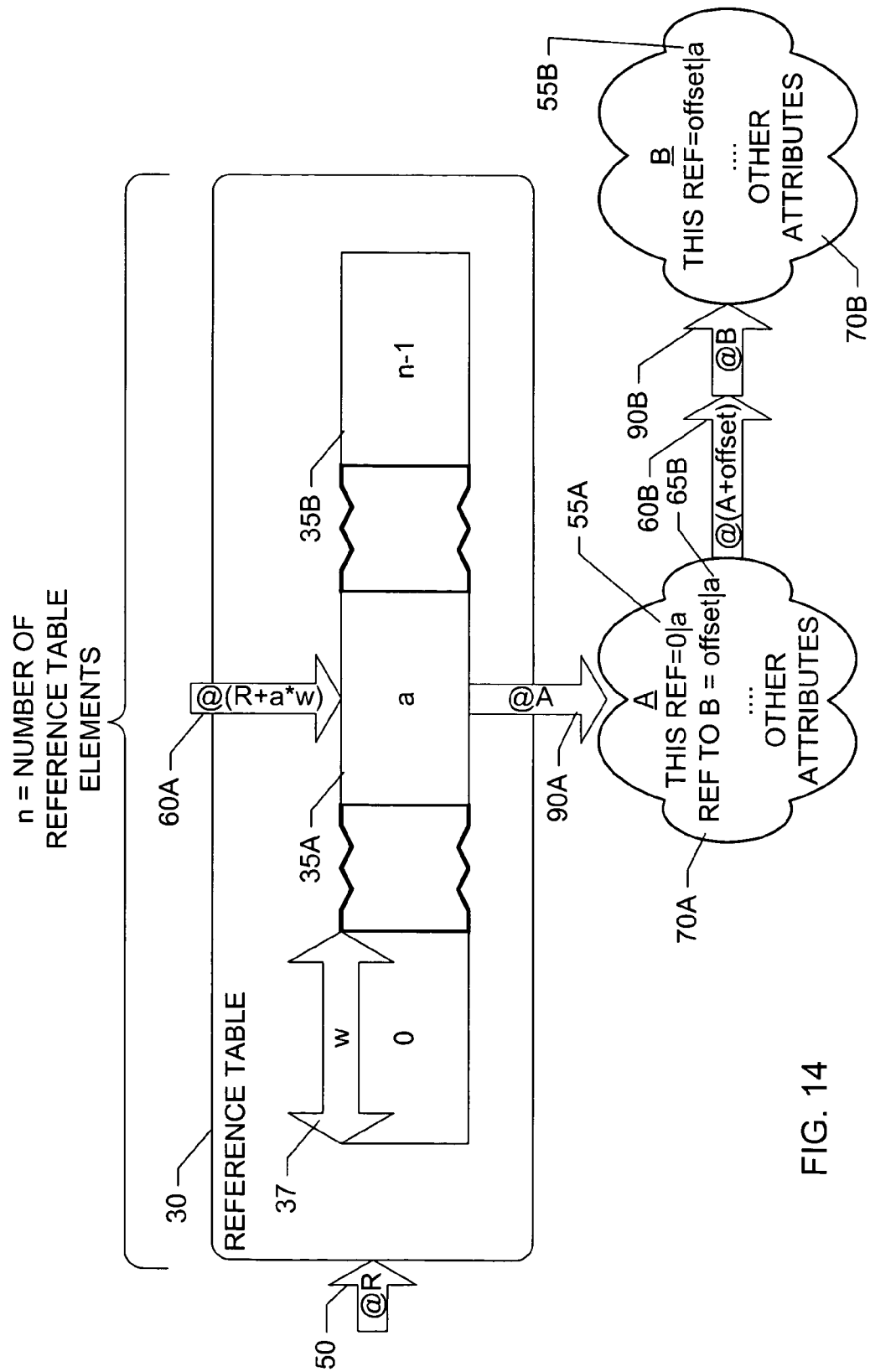

In reference to FIGS. 13 and 14, block diagrams illustrating grouped persisted objects are described. Two persisted objects 70A, 70B are illustrated as they might appear in block 120 of flash 80. Also illustrated is a reference table 30, situated somewhere in RAM 20. The reference table 30 has several storage elements 35 of a fixed size "w" 37 for the indexed access to storage elements. Each used storage element, such as "a" 35A, corresponds to an object 70A which is somewhere in an addressable space. For instance object A 70A finds correspondence with storage element index "a" 35A. However, object B 70B does not find immediate correspondence with storage element Index "b"—this is because object B 70B has been grouped with object A 70A in order to conserve reference table 30 RAM 20 usage. Note how object A 70A is still referenced in the reference table 30, and that its reference 55A "0|a" has an "offset" of 0. Object A 70A is therefore a "root" object, harboring object references to its integral grouped objects, such as object B 70B. Object B 70B is referenced in the format of the "root" object 70A, the address @B 90B of object B 70B is related to the address @A 90A of "root" object A 70A by an "offset". The "offset" 130 is the difference between the flash address @A 90A of object A and the flash address @B 90B of object B. Note that all objects in the group 70A, 70B are in the same block 120 of flash 80. The range of offset 130 is related to the size of block 120. For instance, if flash 80 uses a block 120 of size 64K, then the offset can be represented using 16 bits. The address of "root" object 70A is stored in storage element 35A so that by knowing the index of a "root" object 70A in the reference table 30 it is possible to obtain the address @A 90A of a "root" object. Resolving the address @B 90B of object B 70B can still be related to the reference table 30 via "root" object A 70A. By adding to the address of reference table 30, @R 50 index "a" 35A (multiplied by the width 37) provides the address of the storage element @(R+a*w) 60A (which contains the address @A 90A of the "root" object A 70A). From the "root" address @A 90A, by adding the "offset" 130 of object B's 70B reference "offset|a" 65B in the format of object A 70A, the resulting address @(A+offset) 60B provides address @B 90B of the grouped object B 90B. Also shown is how each object 70A, 70B contains within its format its own reference 55A, 55B ultimately still accessible via reference table 30 for "root" objects, and via "root" objects for grouped objects.

With respect to the size of block 120 of flash 80, the number of reference table Elements "n", and the size of each reference table 30 storage element "w" 37 can be adapted to suit particular needs. For example, if w is 32 bits, then a 32-bit addressable space may be used. If a flash block size of 64K is used, then 16 bits of object references 55A, 55B 65B may be used for the offset and the remaining bits may be used as an index into the reference table 30, as illustrated with the "offset|i" notation. The maximum number of elements "n" depends on the number of object references desired, and therefore imposes the range of the lower order bits representing the index "i" in object references. Of interest is using 16 bits for the index thereby providing a 32-bit object reference, comparable in size to the addressable space address size.

An example of potential RAM 20 savings is given next assuming the values in the above paragraph. The example will illustrate the positive combination of several of the techniques taught thus far. Consider an embodiment within a mobile e-mail device. Assume that an Address object instance might have 9 object references, whereas an Email object instance might have 24 object references. To reference 5000 Address objects and 2000 Email objects simultaneously, without using grouped objects, then 100,000=(5000×10+2000×25) object references are needed. A minimum of ~400K of RAM would be required for a reference table. However, consider the situation where each of the 5000 Address objects and each of the 2000 Email objects are "root" objects, and each of the 9 object references for each Address object and each of the 24 object references for each Email object are grouped and "offset" from each group's "root" Address or Email object. In this grouped form only 7000=(5000+2000) object references for the "root" objects need to be stored in the reference table. A minimum of ~28K of RAM would be required for a reference table—this represents a significant 93% saving as compared to the un-grouped case. If only 400K of RAM is actually available, non-grouped 5000 Address objects and 2000 Email objects would quickly cause a shortage of object references, whereas the scenario using grouped objects leaves ample room to continue allocating new object references. Furthermore, grouped objects may further conserve RAM 20 usage by being persisted to storage, such as flash 80. Further still, by making the "root" persisted objects usable directly from flash 80, Addresses and Emails can be read and used directly from flash without consuming substantial RAM 20. If flash 80 is block-writable, then when Addresses and Emails are grouped and persisted, they can be considered "read-only". In order to modify a "read-only" object, the object is un-persisted and optionally un-grouped, modified, and optionally grouped and persisted anew.

In situations where flash cannot be written to as easily as it is read, then object grouping provides the additional indication that grouped persistent object can be considered "read-only".

It is within the scope of this invention that "root" objects reside in RAM. The use of a "block" illustrates that the addresses within a "block" are substantially proximate, regardless of whether the "block" is in RAM 20 or storage 80. Removing the limitation of "block" writing-only flash 80 still allows for the use of object grouping and un-grouping, and therefore the use of grouping for all manner of objects is within the scope of this invention, whether a grouped object is persisted, or is in RAM. An object need not be persistable to be groupable, nor need be groupable to be persistable.

Figure 15:
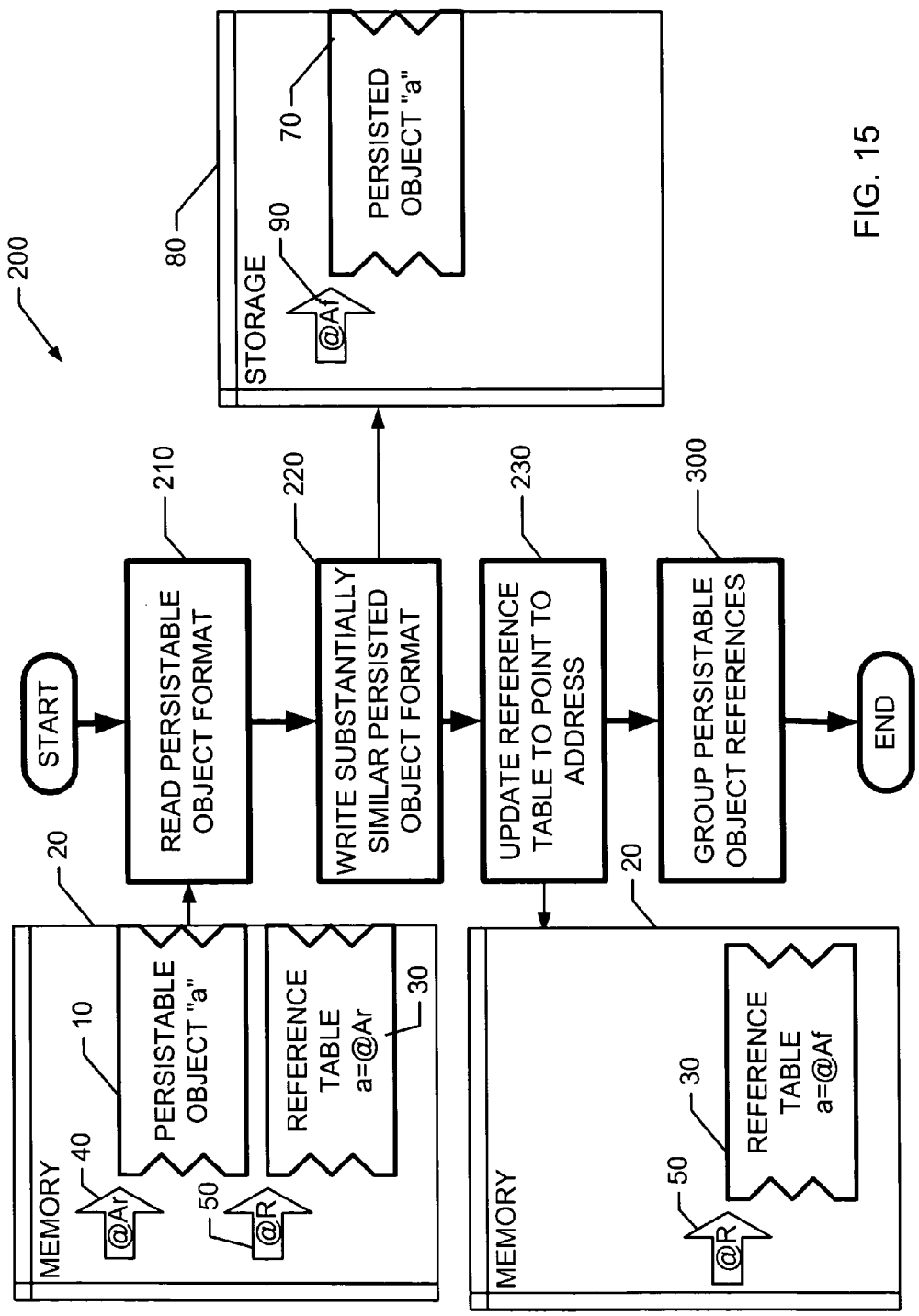
FIG. 15 is a flowchart illustrating an example of persisting objects.

In reference to FIG. 15, a flowchart illustrating persisting objects is described. At step 210, a persistable object's 10 format is read from memory 20. At step 220, a substantially similar persisted object 70 format is written to storage 80.

Optionally, at step 230 the reference table 30 is updated to reflect the change of address from memory address @Ar 40 to storage address @Af 90. This makes the persisted object 70 useable in substantially the same way as the persistable object 10, thereby allowing the persistable object 10 to be destroyed and the persisted object 70 to transparently take its place.

Optionally, at step 300 the objects referenced in the format of the persisted object 70 are persisted in substantially close proximity to the persisted object, as is illustrated in further detail next in reference to FIG. 16.

Figure 16:
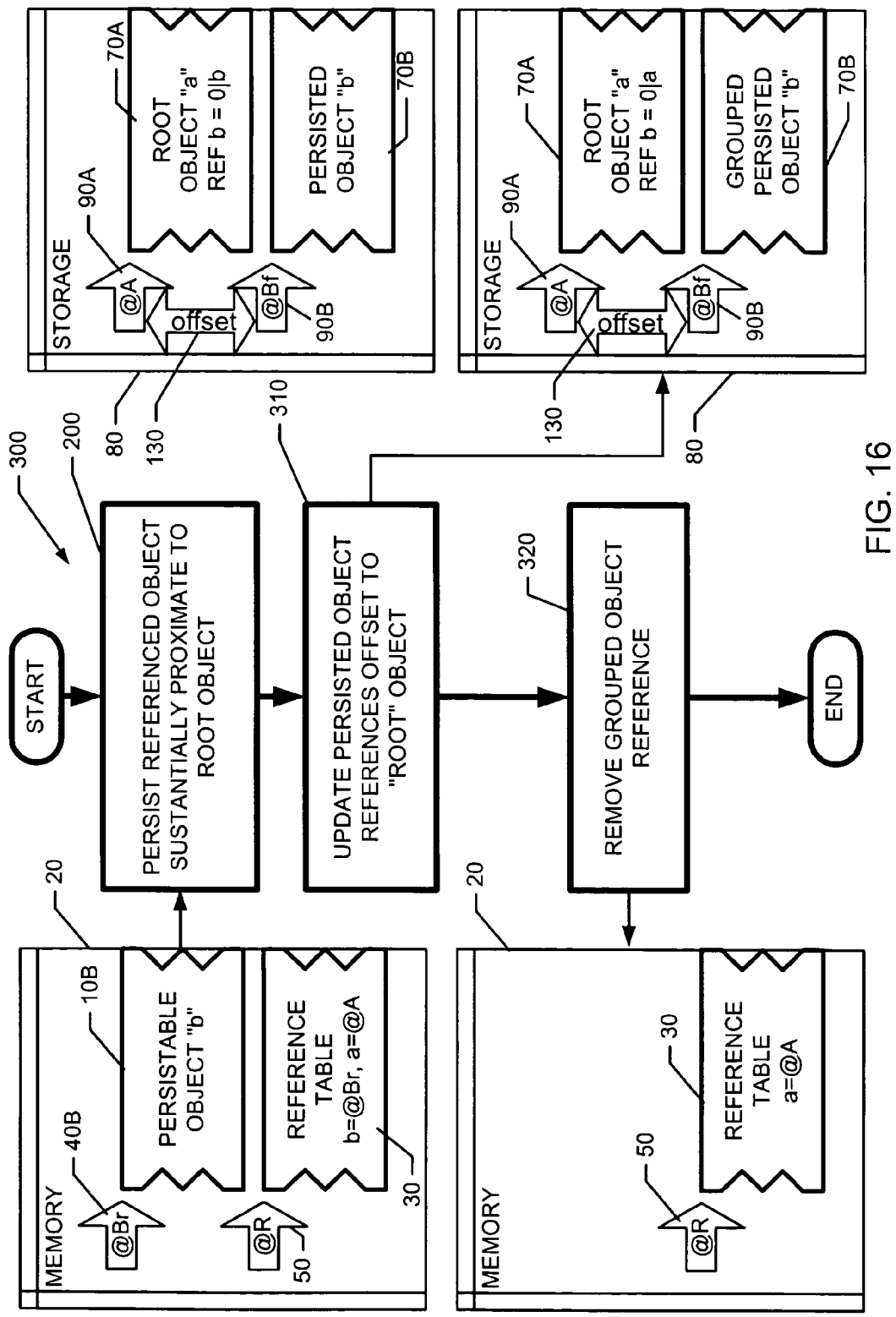
FIG. 16 is a flowchart illustrating an example of object grouping.

In reference to FIG. 16, a flowchart illustrating object grouping 300 is described. At step 200, a persistable object 10B referenced in a root object 70A is persisted, for instance according to the steps described in FIG. 15. The persisted object 70B is located substantially proximate to the root object 70A, and offset 130 from it so as to facilitate grouping.

At step 310, the root object 70A reference is updated to point to the persisted object of step 200, by using a reference which is offset from the root object "offset|a". Optionally, the reference of the persisted object 70B within its format is also updated to "offset|a". Optionally, at step 320 the reference in reference table 30 to the grouped object 70B is removed. The grouped object 70B is still useable via root object 70A.

Figure 17:
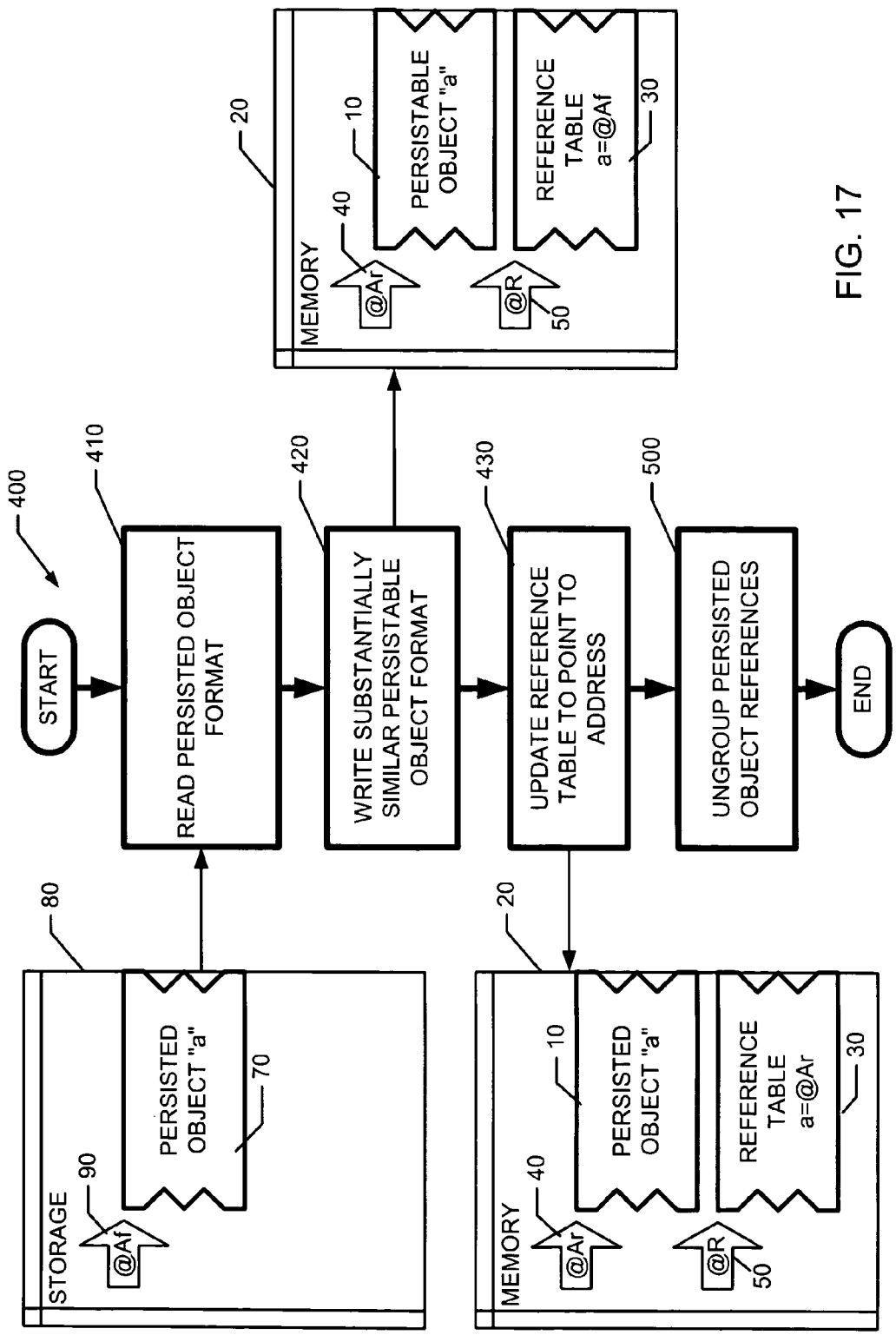
FIG. 17 is a flowchart illustrating an example of un-persisting objects.

In reference to FIG. 17, a flowchart illustrating un-persisting objects 400 is described. At step 410, a persisted object's 70 format is read from storage. At step 420, a substantially similar persistable object 10 format is written to memory 20.

Optionally, at step 430 the reference table 30 is updated to reflect the change of address from storage address @Af 90 to memory address @Ar 40. This makes the persistable object 10 useable in substantially the same way as the persisted object 70, thereby allowing the persisted object 70 to be destroyed and the persistable object 70 to transparently take its place.

Figure 18:
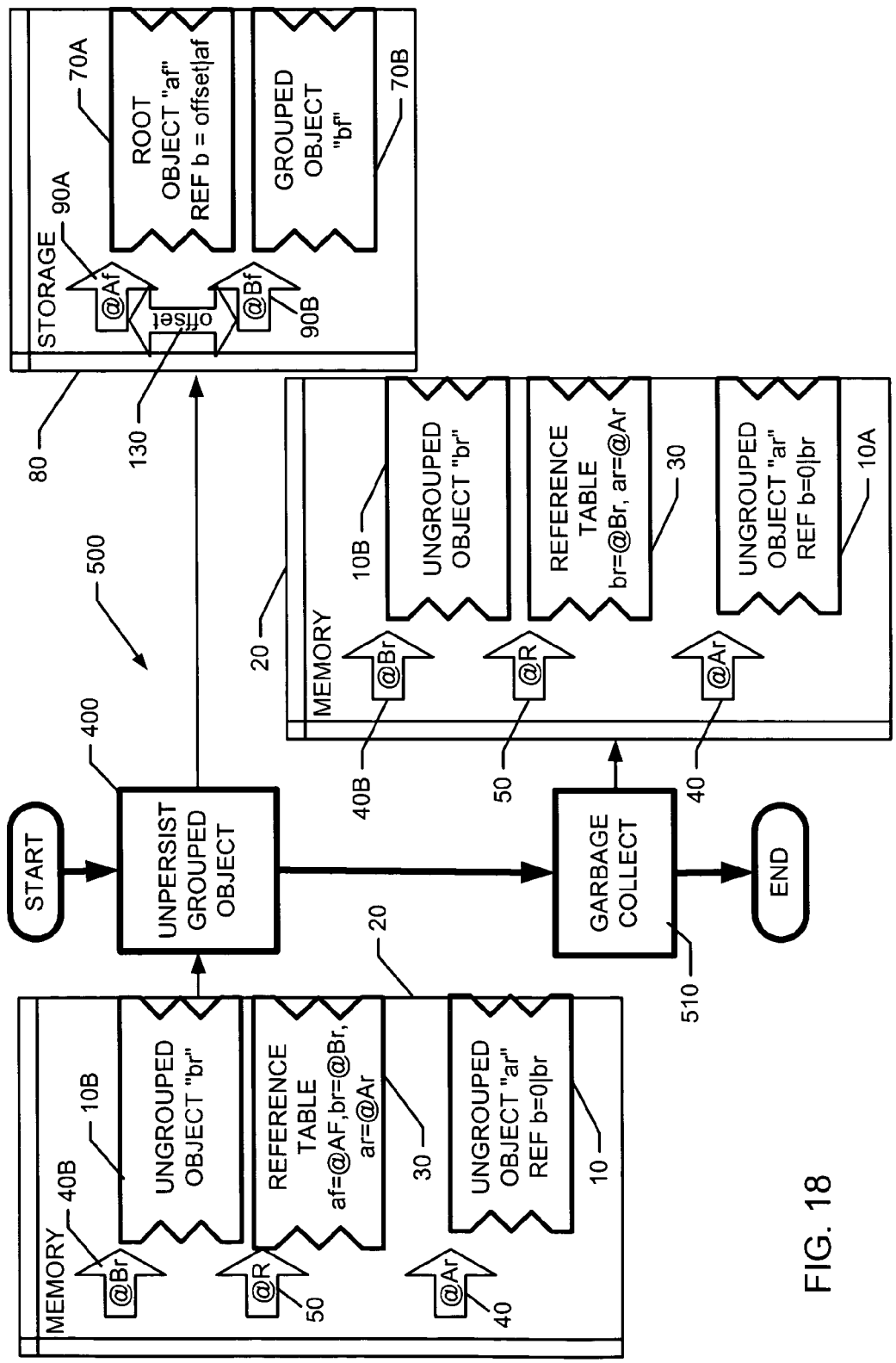
FIG. 18 is a flowchart illustrating an example of object ungrouping.

Optionally, at step 500 the objects referenced by offset, i.e. grouped in the format of the persistable object 10 are ungrouped, as is illustrated in further detail next in reference to FIG. 18.

In reference to FIG. 18, a flowchart illustrating object un-grouping 500 will be described presently. At step 400, a grouped object 70B referenced from a root object 70A is unpersisted, for instance according to the steps of FIG. 17. After step 400, the grouped object 70B continues to exist contemporaneously with the ungrouped 10B counterpart, as is illustrated by the presence of the @Af 90A reference in reference table 30. Ungrouping may create new copies of all objects in the group, relocate all the references is between those objects, and return a new root object. Since reference to grouped objects may still be in use when an object is ungrouped, grouped references continue to resolve properly to grouped objects for as long as the references exist.

Optionally, at step 510, when it is ascertained that grouped references are no longer in use, the grouped objects can be garbage collected thereby recovering the resources used. This is illustrated by the absence of reference @Af 90A in reference table 30. When garbage collection has taken place, only the grouped object 70B is destroyed whereas ungrouped object 10B may still exist. Garbage collection for root object 90A and grouped object 90B can be triggered, for instance by explicitly setting all grouped object references to null, and setting all root object references to null.

Figure 19:
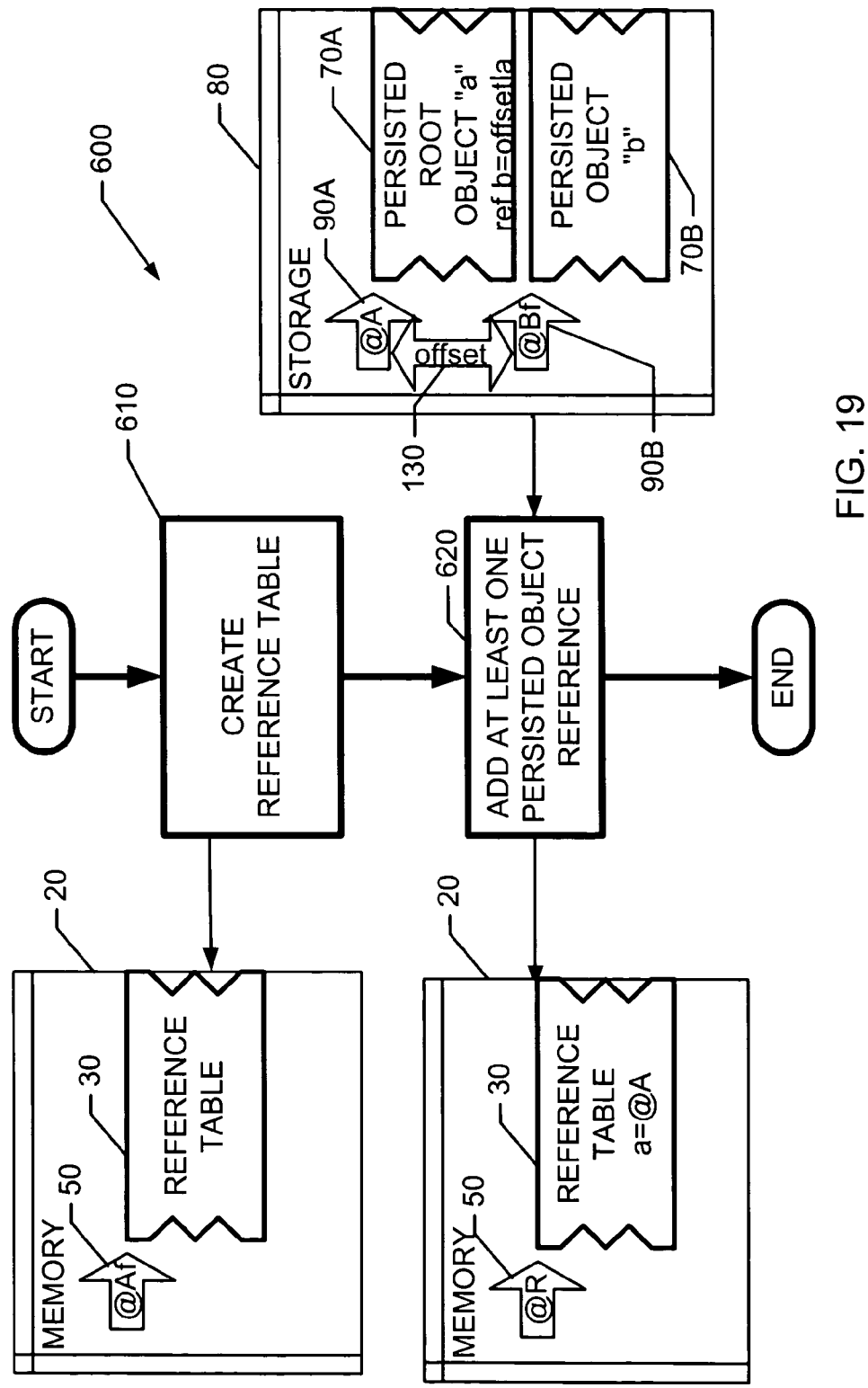
FIG. 19 is a flowchart illustrating an example of re-population of a reference table with persisted object references.

In reference to FIG. 19, a flowchart illustrating the repopulation of a reference table with persisted object references in one embodiment is described. At step 610, a reference table 30 is created in memory 20. At step 620, at least one persisted object 70 reference is added to the reference table 30. Since each persisted objects format contains its own reference, it is possible to retrieve the reference directly from storage without having an entry in the reference table.

It will be appreciated that the above description relates to the invention by way of example only. Many variations on the invention will be obvious to those knowledgeable in the field, and such obvious variations are within the scope of the invention as described and claimed, whether or not expressly described.

It is claimed:

1. A system for handling an application's access of objects for use within a mobile communications device, comprising:
   random access memory (RAM) having storage locations addressable within an addressable space, said RAM containing a persistable first object associated with a first index and having a first address within the addressable space;
   a non-volatile storage device having storage locations addressable within an addressable space, said storage device containing a persisted second object associated with a second index and having a second address within the storage device's addressable space;
   a reference table that contains the first address in a first storage element having a location based on the first index and contains the second address in a second storage element having a location based on the second index, the application locating the first storage element in the reference table based on the first index to obtain the first address for the persistable first object from the first storage element in the reference table and locating the second storage element in the reference table based on the second index to obtain the second address for the persisted second object from the second storage element in the reference table so that the persistable first object and the persisted second object are directly usable by the application as though both the persistable first object and the persisted second object are stored in the RAM.

2. The system of claim 1 wherein the persisted second object is unpersisted into RAM, wherein format of the persisted second object and format of the unpersisted second object are the same.

3. The system of claim 1 wherein access time associated with access of the persisted second object by the application via the reference table is at least an order of magnitude less than access of an object having been persisted through serialization.

4. The system of claim 1 wherein reading and writing of the persisted second object occurs while the second persisted object is persisted.

5. The system of claim 1 wherein the address space associated with the RAM overlaps at least a portion of the address space associated with the storage device.

6. The system of claim 1 wherein the location of the second storage element is based upon an address of the reference table, the second index, and a width of the second storage element.

7. The system of claim 6 wherein the location of the first storage element is based upon the address of the reference table, the first index, and a width of the first storage element.

8. The system of claim 7 wherein the location of the first storage element is an address defined by multiplying the first index by the width of the first storage element and adding the address of the reference table, and
   wherein the location of the second storage element is an address defined by multiplying the second index by the width of the second storage element and adding the address of the reference table.

9. The system of claim 1 wherein the persisted second object contains within its object format a reference to itself.

10. The system of claim 9 wherein the persisted second object contains within its object format a reference to a persisted third object.

11. The system of claim 10 wherein the persisted third object contains within its object format a reference to the persisted second object.

12. The system of claim 9 wherein the reference contained within the persisted second object is used to repopulate address data within the reference table.

13. The system of claim 1 wherein the persistable first object contains within its object format a reference to the persisted second object.

14. The system of claim 1 wherein module objects are persisted in the storage device and whose addresses are stored in the reference table, wherein the addresses of the persisted module objects are obtained from the reference table so that the persisted module objects are usable by the application.

15. The system of claim 14 wherein the module objects hold target-linked object classes.

16. The system of claim 15 wherein code for an object-oriented runtime is executable directly from the storage device via the reference table.

17. The system of claim 1 wherein the application comprises an e-mail address-book application.

18. The system of claim 1 wherein the mobile communications device is a personal digital assistant.

19. The system of claim 1 wherein the mobile communications device is a cellular telephone.

20. The system of claim 1 wherein the mobile communications device is a data communications device.

21. The system of claim 1 wherein the storage device is flash memory.

22. The system of claim 21 wherein writing to the flash memory is performed in blocks, wherein a persisted object is unpersisted prior to modification, and then the unpersisted object is persisted back to the flash memory.

23. The system of claim 1 wherein data stored in the storage device remains when electrical power is removed from the storage device.

24. The system of claim 1 wherein the reference table contains a root object reference to a root object contained in the storage device.

25. The system of claim 24 wherein at least one object is stored in the storage device whose address is determined based upon an offset and the address of the root object.

26. The system of claim 24 wherein a group of objects is stored in the storage device whose addresses are determined based upon an offset and the address of the root object.

27. The system of claim 26 wherein the reference table contains a reference to objects in the group only with a reference to the root object of the group.

28. The system of claim 26 wherein the storage device comprises divisions of blocks, wherein range of the offset is based upon size of the blocks.

29. The system of claim 26 wherein the storage device is block-writable, wherein modification to the persisted second object is performed via a persistable second object that had been generated based upon the persisted second object.

30. The system of claim 29 wherein the persistable second object is ungrouped prior to the modification.

31. The system of claim 26 wherein the root object resides in RAM.

32. The system of claim 26 further comprising:
grouping means for grouping objects contained in RAM.

33. The system of claim 26 wherein the grouping means groups objects contained in RAM.

34. The system of claim 1 wherein object instance data and object inheritance hierarchical data are persisted with respect to the persisted second object.

35. The system of claim 1, wherein the persistable first object has the same format as the persisted second object.

36. The system of claim 1 wherein format of the persistable first object and format of the persisted second object are the same.

37. The method of claim 1, wherein the persisted second object contains within its object format a reference to the persistable first object.

38. A method for handling an application's access of objects for use within a mobile communications device, comprising the steps of:
reading a first persistable object from random access memory (RAM);
writing the first persistable object into a non-volatile storage device at a first address so as to create a first persisted object, the first persisted object being associated with a first index;
storing the first address in a first storage element in a reference table, the first storage element having a location based on the first index; and
locating the first storage element in the reference table based on the first index to obtain the first address of the first persisted object from the first storage element in order to retrieve the first persisted object from the storage device for use by the application, said first persisted object being in a usable state by the application directly from the storage device as though it is stored in the RAM;
said RAM containing a second persistable object at a second address and being associated with a second index, the second address being stored in a second storage element in the reference table at a location based on the second index; and
locating the second storage element in the reference table based on the second index to obtain the second address of the second persistable object from the second storage element in order to retrieve the second persistable object from the RAM for use by the application, said second persistable object being in a usable state by the application directly from the RAM.

39. The method of claim 38 further comprising the steps of:
unpersisting the first persisted object into RAM at a third address so as to create the first persistable object; and
updating the reference table to reflect that the first persistable object is located at the third address, wherein format of the first persisted object and format of the first unpersisted object are the same.

40. The method of claim 39 further comprising the step of:
obtaining the third address from the reference table so that the first persistable object is capable of being retrieved from the RAM and used by the application.

41. The method of claim 40 further comprising the step of:
obtaining a fourth address from the reference table so that a second persisted object is capable of being retrieved from the storage device and used by the application, said second persisted object being in a usable state by the application directly from the storage device.

42. The method of claim 40 wherein access time associated with access of the first persisted object by the application via the reference table is at least an order of magnitude less than access of an object persisted through serialization means.

43. The method of claim 38 wherein address space associated with the RAM overlaps at least a portion of address space associated with the storage device.

44. The method of claim 38 wherein the location of the first storage element is based upon an address of the reference table, the first index, and a width of the first storage element.

45. The method of claim 44 wherein the location of the second storage element is based upon the address of the reference table, the second index, and a width of the second storage element.

46. The method of 45 wherein the location of the first storage elements is an address defined by multiplying the first index by the width of the first storage element and adding the address of the reference table, and
wherein the location of the second storage element is an address defined by multiplying the first index by the width of the second storage element an adding the address of the reference table.

47. The method of claim 38 wherein the first persisted object contains within its object format a reference to itself.

48. The method of claim 47 wherein the first persisted object contains within its object format a reference to a second persisted object.

49. The method of claim 47 wherein the reference contained within the first persisted object is used to repopulate address data within the reference table.

50. The method of claim 38 further comprising the step of:
persisting module objects in the storage device, said module objects having addresses stored in the reference table, wherein the addresses of the persisted module objects are obtained from the reference table so that the persisted module objects are usable by the application.

51. The method of claim 50 wherein the module objects hold target-linked object classes.

52. The method of claim 38 wherein the mobile communications device is a personal digital assistant.

53. The method of claim 38 wherein the mobile communications device is a cellular telephone.

54. The method of claim 38 wherein the mobile communications device is a data communications device.

55. The method of claim 38 wherein the storage device is flash memory.

56. The method of claim 55 wherein writing to the flash memory is performed in blocks, wherein a persisted object is unpersisted prior to modification, and then the unpersisted object is persisted back to the flash memory.

57. The method of claim 38 wherein data stored in the storage device remains when electrical power is removed from the storage device.

58. The method of claim 38 wherein the reference table contains a root object reference to a root object contained in the storage device.

59. The method of claim 58 wherein at least one object is stored in the storage device whose address is determined based upon an offset and the address of the root object.

60. The method of claim 58 wherein a group of objects is persisted in the storage device and whose addresses are determined based upon an offset and the address of the root object.

61. The method of claim 60 wherein the reference table contains a reference to objects in a group only with a reference to the root object of the group.

62. The method of claim 60 wherein the storage device comprises divisions of blocks, wherein range of the offset is based upon size of the blocks.

63. The method of claim 60 wherein the root object resides in RAM.

64. The method of claim 60 further comprising the steps of:
unpersisting the group of objects; and
performing garbage collection upon at least one of the unpersisted object.

65. The method of claim 38, wherein the first persisted object has the same format as the second persistable object.

66. The method of claim 38, wherein the persisted second object contains within its object format a reference to the persistable first object.

67. A system for handling an application's access of objects for use within a mobile communications device, comprising:

a non-volatile storage device having storage locations addressable within an addressable non-volatile space, said non-volatile storage device containing a persisted first object having an address within the addressable non-volatile space and being associated with a first index;

a volatile storage device having storage locations addressable within an addressable volatile space, said volatile storage device containing a persistable second object having an address within the addressable volatile space and being associated with a second index; and a reference table that stores the address of the persisted first object at a location based upon the first index and stores the address of the persistable second object at a location based upon the second index, wherein the application locates the address of the persisted first object from the reference table based on the first index, the application using said persisted first object directly from the non-volatile storage device as though it is in the volatile storage device;

wherein the application locates the address of the persistable second object from the reference table based on the second index, the application using said persistable second object directly from the volatile storage device.

68. The system of claim 67, wherein the persisted first object has the same format as the persistable second object.

69. The system of claim 67, wherein a persisted first object contains within its object format a reference to the persistable second object.

* * * * *

UNITED STATES PATENT AND TRADEMARK OFFICE
CERTIFICATE OF CORRECTION

| | | |
|---|---|---|
| PATENT NO. | : 8,019,789 B2 | |
| APPLICATION NO. | : 10/482756 | |
| DATED | : September 13, 2011 | |
| INVENTOR(S) | : John F. A. Dahms et al. | |

It is certified that error appears in the above-identified patent and that said Letters Patent is hereby corrected as shown below:

In Column 11, Line 30, "method" should read -- system --.

In Column 12, Line 35, "an" should read -- and --.

Signed and Sealed this

Eighth Day of November, 2011

David J. Kappos
*Director of the United States Patent and Trademark Office*